(12) United States Patent
Agetsuma et al.

(10) Patent No.: US 7,966,357 B2
(45) Date of Patent: Jun. 21, 2011

(54) METHOD, SYSTEM, AND APPARATUS FOR FILE SERVER RESOURCE DIVISION

(75) Inventors: Masakuni Agetsuma, Yokohama (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 395 days.

(21) Appl. No.: 12/273,102

(22) Filed: Nov. 18, 2008

(65) Prior Publication Data

US 2010/0082716 A1    Apr. 1, 2010

(30) Foreign Application Priority Data

Sep. 25, 2008   (JP) .................................. 2008-245120

(51) Int. Cl.
*G06F 17/30* (2006.01)
(52) U.S. Cl. ......... 707/831; 707/609; 709/203; 709/229
(58) Field of Classification Search .................. 707/609, 707/822; 709/203, 224, 225, 227, 229
See application file for complete search history.

(56) References Cited

U.S. PATENT DOCUMENTS

| | | | |
|---|---|---|---|
| 7,076,696 B1* | 7/2006 | Stringer | 714/47 |
| 7,269,696 B2 | 9/2007 | Muhlestein et al. | |
| 7,296,041 B2* | 11/2007 | Nakatani et al. | 1/1 |
| 7,321,926 B1* | 1/2008 | Zhang et al. | 709/220 |
| 7,383,327 B1* | 6/2008 | Tormasov et al. | 709/220 |
| 7,725,531 B1* | 5/2010 | Sood et al. | 709/203 |
| 2002/0069369 A1* | 6/2002 | Tremain | 713/201 |
| 2003/0018927 A1* | 1/2003 | Gadir et al. | 714/4 |
| 2003/0055933 A1* | 3/2003 | Ishizaki et al. | 709/223 |
| 2003/0135578 A1* | 7/2003 | Banga et al. | 709/215 |
| 2003/0154288 A1* | 8/2003 | Takamura et al. | 709/227 |
| 2004/0143608 A1 | 7/2004 | Nakano et al. | |
| 2005/0108593 A1* | 5/2005 | Purushothaman et al. | 714/4 |
| 2005/0210074 A1* | 9/2005 | Nakatani et al. | 707/200 |
| 2006/0143711 A1* | 6/2006 | Huang et al. | 726/23 |
| 2006/0277321 A1* | 12/2006 | Arsenault et al. | 709/244 |

* cited by examiner

*Primary Examiner* — Don Wong
*Assistant Examiner* — Sheree N Brown
(74) *Attorney, Agent, or Firm* — Foley & Lardner LLP

(57) ABSTRACT

Provided is a method including the steps of: storing multiple IP addresses and resource management information including correspondence relationships among the multiple IP addresses, multiple file cache regions and multiple virtual file servers; processing multiple file requests transmitted from a client computer in accordance with the resource management information, by use of a lent file cache region being a part of the multiple file cache regions corresponding to the multiple virtual file servers, a lent IP address being a part of the multiple IP addresses, and a lent volume being a part of multiple volumes, the requests transmitted by designating the multiple virtual file servers, respectively; and creating a child virtual file server by receiving a child virtual file server creation request designating one of the multiple virtual file servers.

14 Claims, 17 Drawing Sheets

| NAME | MANAGEMENT FLAG | NIC | Disk | CPU | File Cache |
|---|---|---|---|---|---|
| VS1 | ✓ | eth0,1 | Disk0,1 | CPU0,1 | 32GB |
| VS2 |  | eth6 | Disk7 | share | share |
| VS3 | ✓ | eth3,4,5 | Disk2,3 | CPU2,3,4,5 | 64GB |
| VS4 | ✓ | eth2 | Disk4,5,6 | CPU6,7,8 | 128GB |
| VS5 |  | eth7 | Disk8 | share | 4GB |
| ...OMITTED... | | | | | |
| VS n |  | eth8 | Disk9 | CPU9 | 4GB |

FIG. 4

METHOD, SYSTEM, AND APPARATUS FOR FILE SERVER RESOURCE DIVISION

CROSS-REFERENCE TO RELATED APPLICATIONS

The present application claims a priority from Japanese Patent Application No. 2008-245120 filed on Sep. 25, 2008, the content of which herein incorporated by reference.

BACKGROUND OF THE INVENTION

1. Field of the Invention

The present invention relates to a method, system, and apparatus for file server resource division.

2. Related Art

In order to cut down management costs by centralizing operation management of file server computers, file server consolidation for providing a file sharing service by using a single file server computer that is usually provided by multiple file server computers is proposed. In file server consolidation, a virtual file server is used to enable a single file server computer to provide such file sharing service that has been provided by multiple file server computers. A virtual file server refers to a technique for dividing a hardware resource of a physical file server computer into a number of portions and executing a file server program for each divided resource, so that it seems as if multiple file server computers are virtually operating on a single file server computer.

The specifications of U.S. Patent Application Laid-open Publication No. 2004/143608 and U.S. Pat. No. 7,269,696 disclose techniques for implementing a virtual file server by dividing apart of a file server computer resource on a single OS operating on a server computer, and establishing independent execution environments that allow multiple file request processing programs to be executed separately.

Existing file server virtualization techniques are capable only of plain management in which creation and deletion of virtual servers are collectively managed. For this reason, it has been difficult to utilize the technique in a hierarchical management system required for operation of a company organization, a data center or the like.

SUMMARY OF THE INVENTION

The present invention provides an apparatus, a system, and a method related to a file sharing service for an information processing system. The information processing system is configured of a client computer, a storage device including one or more volumes, a management computer, and a file server providing multiple virtual file servers.

According to an aspect of the present invention, a method for providing a plurality of virtual file servers in an information processing system including a file server which is coupled to a client computer, a storage device including one or more volumes, and a management computer, comprising the steps of a reservation step to reserve a plurality of file cache regions to be used for caching by the plurality of virtual file servers; a storage step to store a plurality of IP addresses set by the management computer, and resource management information including correspondence relationships among the plurality of IP addresses and the plurality of file cache regions and the plurality of virtual file servers; a file request processing step to process a plurality of file requests transmitted from the client computer and designating the plurality of virtual file servers, by use of an assigned file cache region being a part of the plurality of file cache regions, an assigned IP address being a part of the plurality of IP addresses, and an assigned volume region being a sub-region of the one or more volumes, which corresponds to a certain virtual file server of the plurality of virtual file servers, in accordance with the resource management information; a hierarchical information storage step to store, in hierarchization management information, a plurality of identifiers corresponding to the plurality of virtual file servers, each identifier indicating the file server being an assignment source of the assigned file cache region used by a corresponding one of the plurality of virtual file servers; a virtual file server creation step to create a child virtual file server by receiving a child virtual file server creation request which designates one of the plurality of virtual file servers, and store an identifier of the designated virtual file server as an identifier corresponding to the child virtual file server in the hierarchization management information; and a first management step to receive a first login request designating a login virtual file server among the plurality of virtual file servers, and a first management request which is related to the first login request and which designates the child virtual file server, and execute a first management process according to the first management request, if an identifier, stored in the hierarchization management information and related to the child virtual file server, indicates the login virtual file server.

Incidentally, multiple identifiers corresponding to the multiple virtual file servers may be stored in hierarchization management information. Here, each identifier indicates the file server being an assignment source of the lent file cache region used by a corresponding one of the multiple virtual file servers. Moreover, when creating the child virtual file server, an identifier of the designated virtual file server may be stored in the hierarchization management information as an identifier corresponding to the child virtual file server.

Note that a first login request designating a login virtual file server among the multiple virtual file servers, and a first management request which is related to the first login request and which designates the child virtual file server may be received, and first management process according to the first management request may be executed when an identifier stored in the hierarchization management information and relating to the child virtual file server indicates the login virtual file server.

Additionally, the method for providing a plurality of virtual file servers may further comprise a second management step to receive a second login request designating the file server, and a second management request which is related to the second login request and which designates the child virtual file server, and execute a second management process according to the second management request.

The first management process may be to create a grandchild virtual file server by use of a part of the plurality of file cache regions corresponding to the child virtual file server.

The first management process may be to reduce one of the plurality of file cache regions corresponding to the virtual file server to be operated to a certain capacity.

The assigned volume region may be a partition of the one or more volumes. Otherwise, the assigned volume region may be a partition of the one or more volumes.

The assigned volume region may be a memory region provided by a part of the one or more volumes.

A file system may be created in the one or more volumes, and the assigned volume region may correspond to a file system space in a specific directory or lower directories in the file system of the one or more volumes.

According to another aspect of the present invention, a file server including a plurality of virtual file servers, which is coupled to a client computer, a storage device including one or more volumes, and a management computer, comprises a memory storing a plurality of IP addresses set by the management computer, a plurality of file cache regions to be used for caching by the plurality of virtual file servers, and resource management information including correspondence relationships among the plurality of IP addresses and the plurality of file cache regions and the plurality of virtual file servers; and a processor processing a plurality of file requests transmitted from the client computer and designating the plurality of virtual file servers, in accordance with the resource management information, by use of an assigned file cache region being a part of the plurality of file cache regions, an assigned IP address being a part of the plurality of IP addresses, and an assigned volume region being a sub-region of the one or more volumes, to which each of the plurality of virtual file servers corresponds, wherein the memory have a hierarchization management information which stores a plurality of identifiers corresponding to each of the plurality of virtual file servers, each indicating the file server or one of the plurality of virtual file servers being an assignment source of the assigned file cache region used by a corresponding one of the plurality of virtual file servers, wherein at least one of the plurality of identifiers indicates one of the plurality of virtual file servers and at least another one of the plurality of identifiers indicates the file server, and wherein the processor receives a first login request designating a login virtual file server among the plurality of virtual file servers, and a first management request which is related to the first login request and which designates a virtual file server to be operated among the plurality of virtual file servers, and executes first management process according to the first management request if an identifier, stored in the hierarchization management information and corresponded to the virtual file server to be operated indicates the login virtual file server.

Incidentally, at least one of the multiple identifiers may indicate one of the multiple virtual file servers, and at least another one of the multiple identifiers may indicate the file server.

The processor may receive a second login request designating the file server, and a second management request which is related to the second login request and which designates the virtual file server to be operated, and executes second management process according to the second management request.

The first management process may be processing for creating a virtual file server by use of a part of the plurality of file cache regions corresponding to the virtual file server to be operated.

The processor may be configured to restrain to execute the first management process if one of the plurality of identifiers stored in the hierarchization management information and relating to the virtual file server to be operated indicates the file server.

The first management process may be processing for reducing, to a certain volume, one of the plurality of file cache regions corresponding to the virtual file server to be operated.

The reduced file cache region may be used by the virtual file server to be operated.

The file cache region reduction process may be carried out in association with a caching algorithm of the virtual file server to be operated.

The present invention can provide a file server that is adaptable to a hierarchical management system required for operation of a company organization, a data center or the like.

BRIEF DESCRIPTION OF THE DRAWINGS

FIG. 4 illustrates resource management information for managing resources assigned to a management virtual server;

DETAILED DESCRIPTION OF THE INVENTION

Hereinafter, an embodiment of the present invention will be described.

Figure 1:
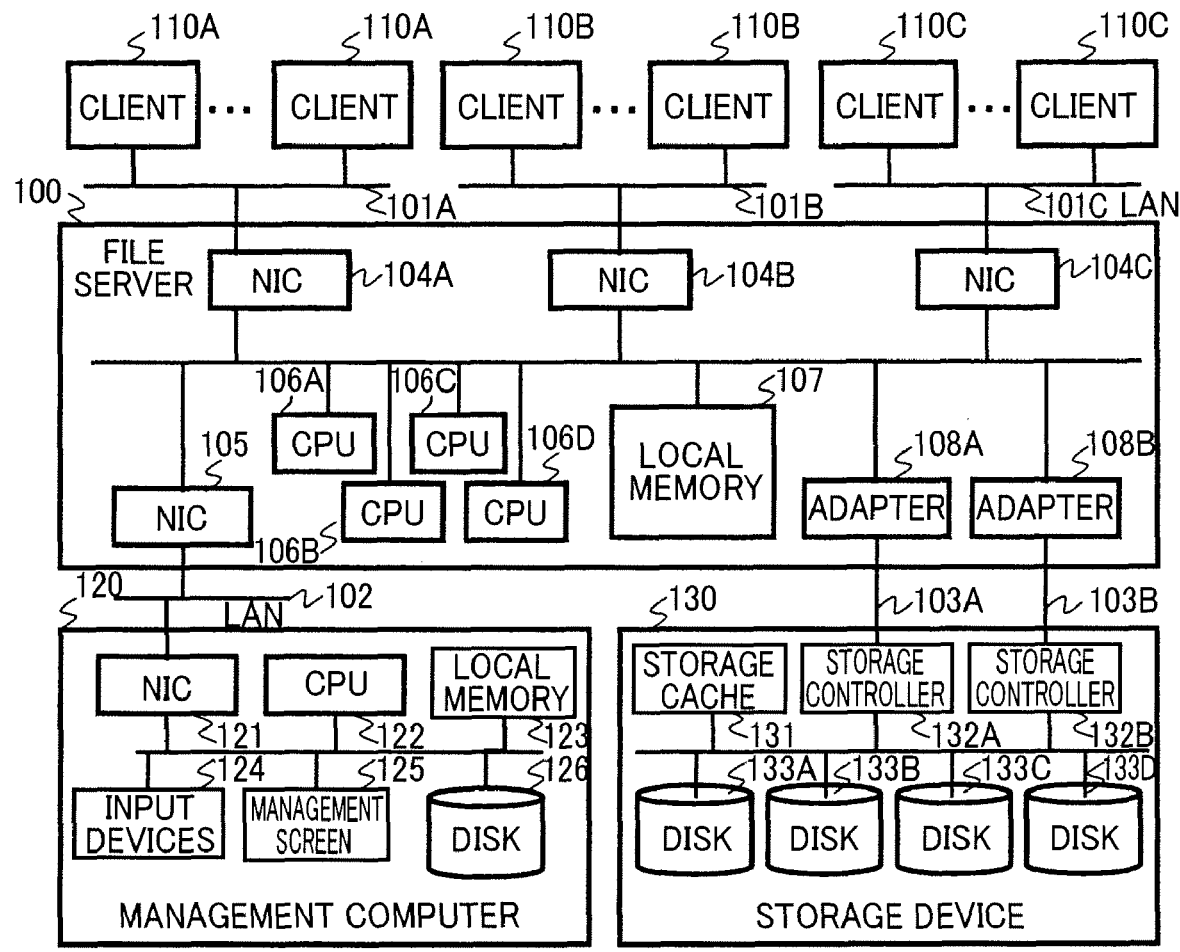
FIG. 1 is a block diagram illustrating a hardware configuration of an embodiment of the present invention.

FIG. 1 is a block diagram illustrating a configuration of an information processing system including a file server 100, a management computer 120, one or more client computers (may be simply referred to as "client" below), and a storage device 130. Note that in the following description, the file server 100 and the storage device 130 may be collectively referred to as network attached storage (NAS), and NAS may include the management computer 120.

The file server 100 is a computer that provides a file sharing service in which clients are allowed a so-called access to the file server 100. For example, the accessing includes: reading and writing from and to data of files requested by the clients; creation, deletion or attribute reference of files; and creation, deletion or attribute reference of directories. The file server 100 is configured of NICs 104A to 104C and 105, central processing units (CPUs) 106A to 106D, a local memory 107 and adapters 108A and 108B, each component being connected by an internal bus or an internal network. Note that numbers of the NIC 104, the CPU 106, the local memory 107 and the adapter 108 are not limited to the numbers respectively shown in FIG. 1. Additionally, the file server 100 may be configured of multiple computers each having a function so as to form a single virtual file server as a whole.

Figure 2:
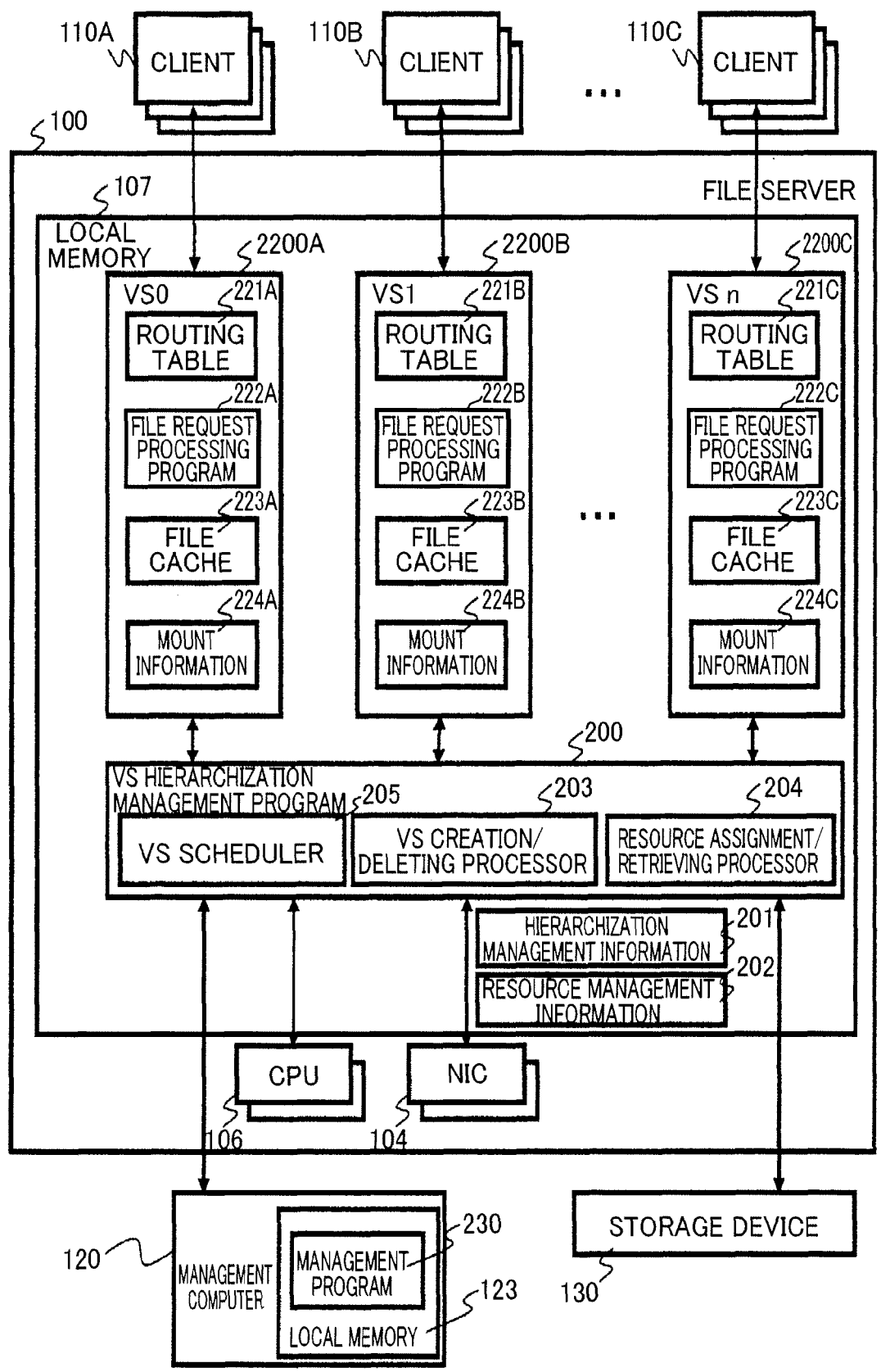
FIG. 2 is a block diagram illustrating a software configuration of the embodiment of the present invention.

The CPUs 106 are processors that control the file server 100. The CPU 106 executes programs stored in the local memory 107. For instance, the CPU 106 executes a program for providing a file sharing service (server program), and provides a file stored in the storage device 130 to the client 110. A detailed configuration of a program stored in the local memory 107 is shown in FIG. 2.

The local memory 107 is a semiconductor memory, for example, and is a main memory unit that stores programs executed by the CPU 106, as well as data and file cache to which the CPU 106 refers. Incidentally, an HDD, for example, which is a memory unit having a lower speed than a semiconductor memory may be installed and used as a part of the local memory 107.

The file server 100 uses the NIC 104 for transmission and reception of data to communicate with the clients 110. Meanwhile, the file server 100 uses the NIC 105 for transmission and reception of data to communicate with the management computer 120. The file server 100, the client 110 and the management computer 120 communicate with each other by use of network protocols such as TCP and UDP. Incidentally, although being an abbreviation of "network interface card", NIC is may be referred to as a "network port." It is preferable that different hardware be used as the NIC 104 and the NIC 105 from the view point of performance, reliability and the like. However, the same hardware may also be used to serve as the NIC 104 and the NIC 105.

The adapters 108 are used to connect the file server 100 and the storage device 130 which is a secondary storage device. The CPU 106 receives data and transmits, through the adapter 108, an access request for a program or a file stored in the storage device 130. Here, the access request is in a block address form and is represented by read and write. Incidentally, from the viewpoint of performing communication, the same hardware as the NICs 104 and NIC 105 may be used to serve as the adapter 108. However, it is preferable from the viewpoint of performance and reliability that hardware different from those used for the NICs 104 and NIC 105 be used as the adapter 108. As will be described in detail later, in the present invention, the NIC 104 receives an access request in a file form from the client 110A, client 110B or client 110C (simply denoted as "client 110" below in such cases where a client does not need to be specified as being connected to a specific NIC), and transmits requested data or control information. Meanwhile, the adapter 108 transmits an access request in a block address form which is created by the CPU 106, and receives control information or data in a block form from the storage device 130.

The client 110 is a computer that accesses the file sharing service provided by the file server 100. Although not shown in FIG. 1, the client 110 is configured of a CPU, a memory and a NIC.

The management computer 120 is a computer that manages the file server 100 and programs which operate on the file server 100. The management computer 120 is configured of a NIC 121, a CPU 122, a local memory 123, input devices 124, a management screen 125 and a built-in disk device 126, each component being connected by an internal bus or an internal network.

The NIC 121 is used to communicate with the file server 100 through a LAN 102.

The CPU 122 is a processor that controls the management computer 120. The CPU 122 executes programs stored in the local memory 123. For instance, the CPU 122 executes a program for managing the file server 100 (management program), and changes settings of a server program that operates on the file server 100.

The local memory 123 is a semiconductor memory, for example, and is a main memory that stores programs executed by the CPU 122 and data to which the CPU 122 refers. Note that the built-in disk device 126 may be used as a part of the local memory.

The input devices 124 are a keyboard and a mouse, for example, for giving instructions to programs that operate on the management computer 120. The management screen 125 is a display for displaying user interfaces of programs that operate on the management computer 120. In other implementations, multiple management computers 120 may be provided. Incidentally, an operation computer different from the management computer 120 may control the input devices and the management screen. In such a case, input to the operation computer is received by the management computer through communication. Similarly, information displayed on the management computer is transmitted to the operation computer, and so the operation computer performs a screen display in accordance with the received display information.

The storage device 130 is a secondary storage device for storing programs and files used by the file server 100. The storage device 130 is configured of a storage cache 131, storage controllers 132A and 132B and disk devices 133A to 133D, each component being connected by an internal bus or an internal network. The numbers of storage caches 131, storage controllers 132, and disk devices 133 are not limited to the numbers respectively shown in FIG. 1. Note that the NAS system of the present invention may include multiple storage devices.

The storage controllers 132 communicate with the file server 100 and control the storage device 130. To be specific, the storage controller 132 communicates with the file server 100 to read or write data from or to the disk device 133 according to a request from the file server 100, by use of the later-described storage cache 131. As described above, an access request received by the storage controller and data transmitted by the storage controller cover block data (may be simply referred to as "blocks") specified in block address forms.

The storage cache 131 is a semiconductor memory, for example, and is used to temporarily store data to be written to the disk device 133 or block data read from the disk device 133. Incidentally, a memory unit having a lower speed than a semiconductor memory may be used as a part of the storage cache 131.

The disk device 133 is a device for storing data. Although four disk devices (133A to 133D) are shown in FIG. 1, any number of volumes 133 may be provided in the storage device 130. Note that while an HDD is typically used as the disk devices 133A to 133D, other devices may be used as long as the device can store data in block form. For example, a DVD, a CD or a solid state disk (semiconductor disk) may be used instead.

In order for higher speed, redundancy, higher reliability and the like, the storage controller may execute processing with the use of one or more virtual disk devices in place of the multiple disk devices 133 and to allow the file server 100 to access the virtual disk device (more specifically, processing disclosed in the RAID technique). Note that this virtual disk device is hereinafter referred to as a "volume," and in a case of a description "the storage device or storage controller writes block data to the volume" in reality means that the storage controller 132 writes block data to the storage cache 131 or the disk device 133. Similarly, in a case of a description "the storage device or the storage controller reads block data from the volume" in reality means that the storage controller 132 reads block data from the storage cache 131 or the disk device 133.

The FC 103 between the adapter 108 of the file server 100 and the storage controller 132 of the storage device 130 may be connected via a switch. Meanwhile, multiple storage devices 130 may be connected to the file server 100. The file server 100 and multiple storage devices 130 may form a storage area network (SAN). While multiple clients 110A to 110C are respectively connected to three LANs 101A to 101C in FIG. 1, other connection formations may be employed. Similarly, while the file server 100 is connected to the management computer 120 through the LAN 102, the LAN 102 and the LANs 101A to 101C may be a common network.

While the communication paths 103 between the adapters 108 and the storage device 130 may be connected by use of fiber channels (FC), for example, other communicable connection media (such as Ethernet) may also be used.

Next, an outline of the present invention will be described with reference to a schematic view shown in FIG. 5. Incidentally, items described in the outline are mere examples, and are not intended to limit the present invention.

As a system for managing information appliances in an organization, a hierarchical management system is employed in some cases. A hierarchical management system includes a designated person in charge, a person in charge within a department, and a person in charge within a section, and the like. For instance, management authority is decentralized such that the number of server computers to be shared in a department is increased or decreased under the authority of the person in charge within the department, whereas the number of server computers to be used in a section is increased or decreased under the authority of the person in charge within the section.

On the other hand, in a conventional virtual file server, the authority to allocate a resource in a file server for creating or deleting the virtual file server is limited. Only an administrator or the like of an OS (host OS) having a specific authority to firstly move the file server can allocate the resource.

For this reason, in an organization using a virtual file server, for example, a person in charge within a department or a person in charge within a section cannot prepare a new virtual server by him/herself. Hence, every time a new virtual file server needs to be prepared, a request must be made to a designated person in charge who is an administrator of the host OS of the server computer. As a countermeasure for this situation, the person in charge within a department or the person in charge within a section may be made administrator of the host OS. However, such an operation allows any administrator to freely create a virtual server, and to occupy the resource of the server computer. This is not preferable from the viewpoint of resource operation management and security, in the case of a data center and the like where a server computer is shared among multiple organizations.

In order to operate a virtual file server while maintaining security under these circumstances, the present invention achieves multilevel management of the virtual file server.

Note that the virtual file server of the present invention has all of the following characteristics including those having been implemented in conventional techniques. However, some of the characteristics (such as (D) and (G)) are not essential for obtaining the benefits of the present invention.

(A) Each virtual file server is assigned, of the CPU 106, the local memory 107, the adapter 108, the NIC 104 and the NIC 105 (more than one may be provided for each component) which are included in the file server, at least any one of or a portion (if there is only one CPU 106, NIC or adapter, this may refer to a portion of a time slice obtained from time division; and if there is only one local memory, this may refer to a portion of an entirety obtained by space division or usage division). The virtual file server uses the assigned components to provide a file sharing service. Here, provision of a file sharing service includes creation, update, deletion and attribute modification of a file and of a directory; and provision of a file namespace including a file, a directory and the like as well as operation executed thereon. Other services may also be included in the provision of a file sharing service. The provided items may be replaced by operations necessary for providing access in an object form represented by XAM, or may be replaced by operations necessary in another protocol.

(B) To provide the file sharing service, each virtual file server has a different IP address. Accordingly, the client 110 regards each virtual file server as being an independent physical computer.

(C) To provide the file sharing service, each virtual file server provides a different namespace of a file. In other words, each virtual file server provides, as namespaces of files, separate subspaces of a namespace which the file server 100 stores in the volume of the storage device 130.

(D) To provide the file sharing service, each virtual file server includes user groups for individual namespaces of files to be provided, and controls access according to the users.

(E) To provide the file sharing service, each virtual file server is capable of managing settings of its own. Examples of the managed settings include the aforementioned user setting, and settings (such as assignment of an IP address) related to the CPU 106, the local memory 107, the adapter 108, the NIC 104 and the NIC 105 used by the file server.

(F) In the file sharing service or the management in (E), each virtual file server does not use the CPU 106, the local memory 107, the adapter 108, the NIC 104 or the NIC 105 that is not assigned to itself. Accordingly, security and performance can be ensured.

(G) Each virtual file server may include one or more client identifiers that allow usage of the file sharing service that the virtual file server provides (in other words, allow access to a namespace of a file that the virtual file server provides), or one or more client identifiers that limit usage of the service. In this way, the virtual file server may perform access control.

Note that in some implementations, the CPU 106, the local memory 107, the adapter 108, the NIC 104 and the NIC 105 assigned in (A) are fixed, so that the assignment may not be changed unless settings are changed in (E). There may be a case where, assignment may be dynamically changed for certain portions. For example, the local memory 107 may automatically be assigned to the virtual file server if there is extra space, while an alternative component may be used when an operational error is detected or predicted in any of the components. The assignment of components may also be changed for other reasons.

Meanwhile, as for the settings for individual virtual file servers performed in (E), each file server may be assigned a unique administrative IP address and a password for authentication before carrying out a management operation. However, if information by which each virtual file server can be specified is transmitted instead of an IP address from the management computer, this information may be used alternatively. For example, there may be processing that is carried out for inputting a virtual file server to be authenticated, to an authentication screen shared in the file server 100.

Incidentally, in the present invention, the above processing is carried out in a later-described file request processing program or a VS hierarchization management program included in the file server 100.

Figure 5:
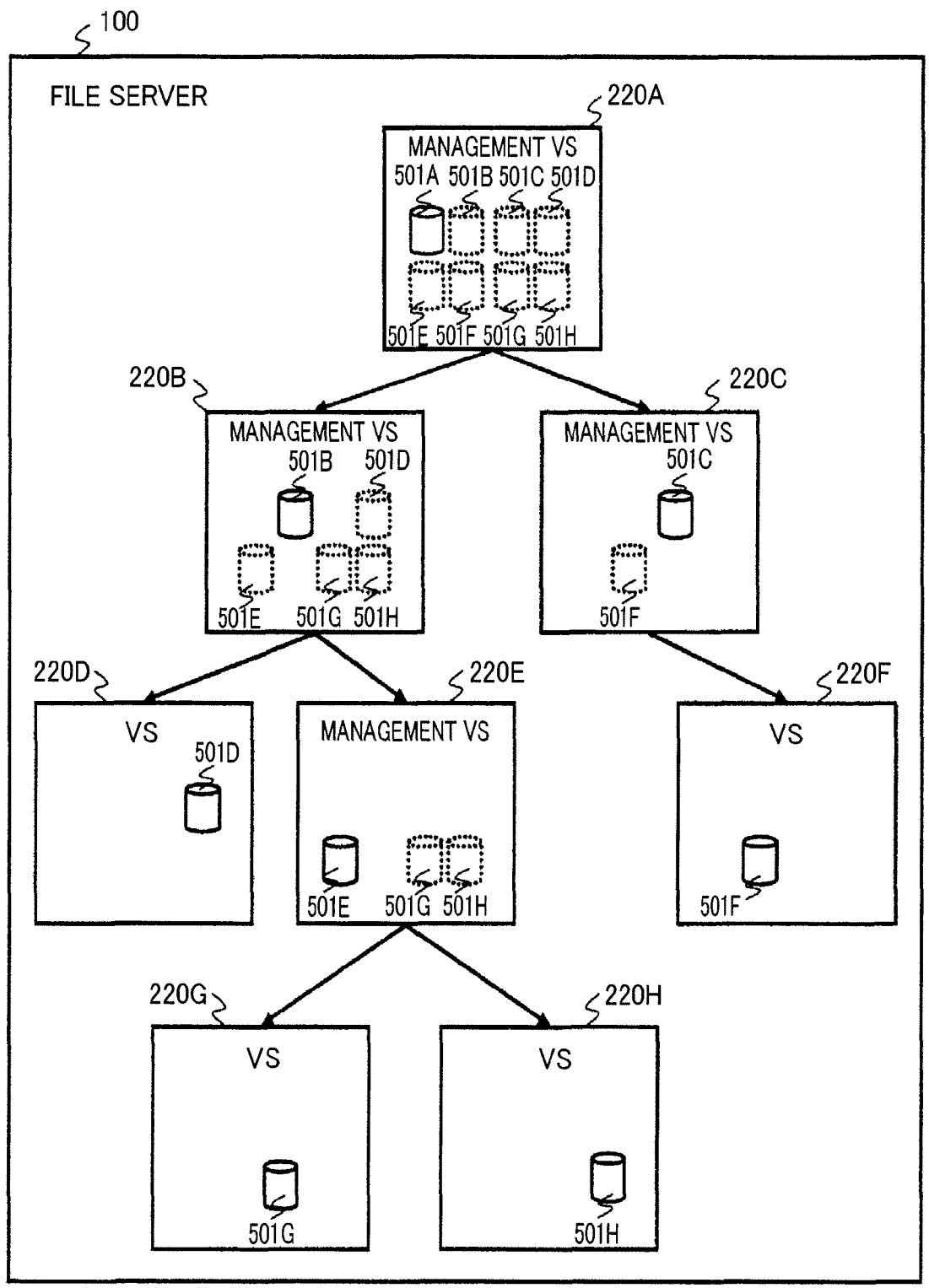
FIG. 5 is a schematic view illustrating an outline of the present invention.

FIG. 5 is a schematic view illustrating an example of relationships between virtual file severs (may be referred to as VS below) 220 and a state of dividing a resource, of the present invention.

In FIG. 5, the file server 100 performs processing to provide eight VSs 220 denoted by 220A to 220H to the client 110. Here, the file server 100 manages the VSs 220 hierarchically. Each of the VSs 220A, 220B, 220C and 220E indicates a management Vs. Incidentally, a management virtual file server (a management VS) refers to a virtual file server that can perform setting function (or is allowed to provide such setting processing to the management computer 120) for defining a new virtual server and assigning, as described in the description (A) for the virtual file server, at least any one of or a part of components assigned to itself to the new virtual server. Here, the assigned components include the CPU 106, the local memory 107, the adapter 108, the NIC 104 and the NIC 105 (more than one may be provided for each component).

In each of the VSs 220, multiple volumes 501 are illustrated as a typical example of resources managed by the VS 220. Note that the volume 501 shown by a solid line indicates a volume that can be used by the VS 220 itself. Meanwhile, the volume 501 shown by a broken line indicates a volume that cannot be used by the management VS itself because the management VS has already assigned the volume to a defined virtual file server.

In this example, the management VS 220A manages eight volumes including a volume 501A usable by the management 220A itself and seven volumes 501B to 501H unusable by the management 220A itself. Meanwhile, the VS 220H manages a single volume 501H which is usable by the VS 220H.

As described above, in the case where a management VS 220 (parent VS 220) defines (may be expressed as "creates") a child VS 220, the management VS 220 assigns (may be expressed as "lends" below) some of the usable volumes 501 to a child VS 220 to create the child VS 220. For instance, the unusable volumes 501B to 501H among the volumes 501 managed by the management VS 220A are those being lent to the management VS 220B and the management VS 220C. The management VS 220A itself cannot use a volume 501 that is lent to another VS 220.

On the other hand, in the case where a management VS 220 deletes a child VS 220, the management VS 220 cancels the assignment of (may be expressed as "collects") a volume 501 that had been managed by the child VS 220 to be deleted (that is, the resource that had been lent to the child VS 220 by the management VS 220). The volume 501 that the management VS 220 collects is usable by the management VS 220. For example, when the management VS 220A deletes the management VS 220C, the management VS 220A collects the volumes 501C and 501F managed by the management VS 220C. At this point, the volumes 501C and 501F become usable by the management VS 220A.

The hierarchy structure in FIG. 5 is obtained in the case where the management VS 220A creates the management VS 220B to which the volumes 501B, 501D, 501E, 501G and 501H are lent, the management VS 220A creates the management VS 220C to which the volumes 501C and 501F are lent, the management VS 220B creates the management VS 220D to which the volume 501D is lent, the management VS 220B creates the management VS 220E to which the volumes 501E, 501G and 501H are lent, the management VS 220C creates the management VS 220F to which the volume 501F is lent, the management VS 220E creates the management VS 220G to which the volume 501G is lent, and the management VS 220E creates the management VS 220H to which the volume 501H is lent.

The schematic view in FIG. 5 has been described by using the volumes 501 as a typical example of a resource managed by the VS 220. However, the resource to be managed by the VS 220 in the present invention is not limited to the volume 501. The VS 220 may manage various resources such as the CPU 106, the local memory 107 (including the case of being used as a cache memory), the adapter 108, the NIC 104 and the NIC 105.

As has been described with reference to the example, virtual file servers can be managed hierarchically by giving authority to specific virtual file servers (management virtual file servers) for creating and deleting virtual file servers, so that parent-child relationships may be formed among the virtual servers. As described above, each virtual file server can have a different password to authenticate an administrator for carrying out various management operations. Accordingly, an administrator of a certain management virtual file server can create and delete virtual servers by use of resources assigned to itself, even if passwords for other management virtual file servers are unknown. Thus, higher security can be ensured.

Hereinbelow, a case of employing the virtual file server of the present invention at a data center will be cited as an example. An administrator at the data center who is allowed to carry out management operations on the management VS 220A lends the authority for managing a management virtual file server to a client. Accordingly, the client can flexibly create and delete a virtual file server (such as the management VS 220B), or modify assignment of resources at arbitrary timings (the client may establish a new affiliate and set up a small computer management department in the affiliate, for example) within the range of given resources. Moreover, settings can also be performed separately for a grandchild VS 220 (such as the VS 220D) created by the client's virtual file server. Thus, the aforementioned small computer management department can perform settings for the VS 220D to create or delete users in accordance with an increase or decrease in the staff of the affiliate.

As another example, a description will be given of a case where a data center managing the file server 100 lends a VS 220 of the file server to each of companies A and B. Here, the management VS 220 of the data center is referred to as VS 220DC, the management VS 220 lent to company A is referred to as VS 220A, and the management VS 220 lent to company B is referred to as VS 220B. Additionally, each of the VSs 220A and 220B is assumed to be a child VS 220 of the VS 220DC.

A system administrator of the file server 100 in the data center can log in to a management program 230 while being authorized to control the entire file server 100. Then, having logged in to the management program 230, the system administrator of the file server 100 can freely lend and collect resources of the file server 100 to and from the VSs 220A, 220B or the like.

Meanwhile, an administrator of company A can log in to the management program 230 while being authorized to control resources of the VS 220A. Then, having logged in to the management program 230, the administrator of company A can freely create or delete a child VS 220, and lend or collect a resource within the range of resources owned by the VS 220A. Moreover, the administrator of company A can lend resources borrowed from the data center to each department in the company, by creating a child VS 220 as a management VS 220 for each of the departments in the company.

An administrator of each management VS 220 of each department in company A can also create a child VS 220 according to the resource lent from the administrator of company A. Accordingly, the administrator of each department in company A can independently create or delete a child VS 220, and lend or collect a resource in the department. At this time, the administrator of each department does not need to receive any assistance in carrying out the operations from the administrator of company A who manages the VS 220A in a higher tier, or to the system administrator who manages the VS 220DC in a further higher tier. The administrator of VS 220 may need assistance from the administrator of the management VS 220 in a higher tier only when the VS 220 needs to be assigned (to borrow) a resource that the VS 220 does not already have from a higher-tier management VS 220, for example.

Thus, the present invention allows efficient management of resources of the VS 220A borrowed from the data center, by distributing the resources among administrators of different departments or among administrators of smaller groups included in each of the departments.

The only VSs 220 that the administrator of company A can manage are those in a lower tier than the VS 220A. Processing for creating or deleting a child VS 220, and assignment or retrieving a resource in company A can be carried out without influencing the VS 220B or VS 220s in a lower tier than the VS 220B which are managed by company B. The processing can be carried out without influencing the VS 220 DC managed by the system administrator of the data center, either.

Thus particularly in the case where various organizations operate a large number of VSs 220 in the file server 100, the hierarchical management of the present invention allows efficient distribution and management of the VSs 220 in the file server 100 and resources to be lent to the VSs 220, among multiple administrators.

It should be noted that the above use case is a mere example, and is not intended to limit usage of the present invention.

Hereinafter, a detailed description of the present invention will be given.

FIG. 2 is a block diagram illustrating a configuration of a program and information, as well as a relationship between hardware and the program and information according to the present invention.

The local memory 107 of the file server 100 stores a VS hierarchization management program 200 and multiple pieces of virtual server information (may be referred to as VSI below) 2200.

The VSI 2200 is information including programs and information necessary for providing multiple virtual file servers.

The VSI 2200 includes a routing table 221, a file request processing program 222, a file cache 223 and mount information 224.

The routing table 221 has a data structure storing identification information of the NIC 104 used when the file request processing program 222 of the VS 220 transmits information to the client 110. The routing table 221 may store multiple pieces of identification information on multiple NICs 104 that can be used by the VS 220. Incidentally, the information may be provided in a data structure other than the table (referred to as routing information) as long as it includes the information stored in the routing table 221.

The file request processing program 222 is a program through which the VS 220 provides a file sharing service to the client 110. A single piece of VSI 2200 may include multiple different types of file request processing programs 222 (such as a case where one program supports the NFS protocol while another type of program supports CIFS). For instance, a single piece of VSI 2200 may simultaneously provide file sharing services in NFS and CIFS to the client 110. Meanwhile, different VSIs 2200 may include the same type of file request processing program 222.

Moreover, the VS 220A, the VS 220B and the VS 220C may simultaneously provide the same file sharing service. At this time, instead of storing an actual execution form of the file request processing program in the VSI 2200, the execution form of each VSI 2200 may be stored in the local memory 107 different from the VSI 2200 (while omitting redundant execution forms). Then, each piece of the VSI 2200 may store an identifier for identifying the one or more execution forms stored in the local memory 107. If the same execution form is employed for all of the file request processing programs 222 while only the setting information is varied for each program, the setting information alone may be stored in the VSI 2200.

The file cache 223 is a memory region used by the file request processing program 222 to temporarily store therein data to be written to the volume 133 and data read from the volume 133. The file cache 223 is provided so that the file request processing program 222 can access the volume at high speed. For instance, when the file request processing program 222 reads data from the volume 133, the file request processing program 222 stores the read data in the file cache 223. Then, in the case of reading the same data again, the file request processing program 222 can read the data from the file cache 223 in the high-speed local memory 107. Similarly, when writing data to the volume 133, the file request processing program 222 can read the data from the file cache 223 in the high-speed local memory 107, update the data and write the data to the volume 133. A region of the file cache does not necessarily need to be a continuous region on the local memory, and may be a region that is dynamically reserved in accordance with a predetermined standard such as a capacity when a file cache is required. Otherwise, a continuous region on the local memory may be used as a file cache, as a matter of course. In the case of the continuous region, data stored in the file cache region and information for managing free space (such as a free queue and a dirty queue) can be managed for individual VSs 220. Accordingly, competition between performances of VSs 220 for referring to cache management information can be avoided. Additionally, the file cache region indicated by the information is reduced, and thus the information amount itself can be reduced. Hereinafter, a file cache region will include both of these cases if not specified otherwise.

The mount information 224 is information storing therein correspondences between positions in the namespace of files used by the file request processing program 222, and identification information of the volume 133 storing the file system forming the namespace. The mount information 224 may store therein identification information for multiple volumes 133. Incidentally, a structure other than the table may be employed as the data structure of the mount information. The file request processing program 222 provides a service to the client 110 by use of the volume 133 whose identification information is stored in the mount information 224. The file request processing program 222 provides this service by storing files that the client 110 reads and writes to the volume 133 corresponding to the identification information stored in the mount information 224.

The VS hierarchization management program 200 is a program for creating and deleting VSs 220 in response to instructions from the management computer 120, and managing resources of the VSs 220 and parent-child relationships among the VSs. The VS hierarchization management program 200 includes a VS creation/deletion processor 203 and a resource assignment/retrieving processor 204. Additionally, the VS hierarchization management program 200 mainly uses hierarchization management information 201 and resource management information 202.

Figure 3:
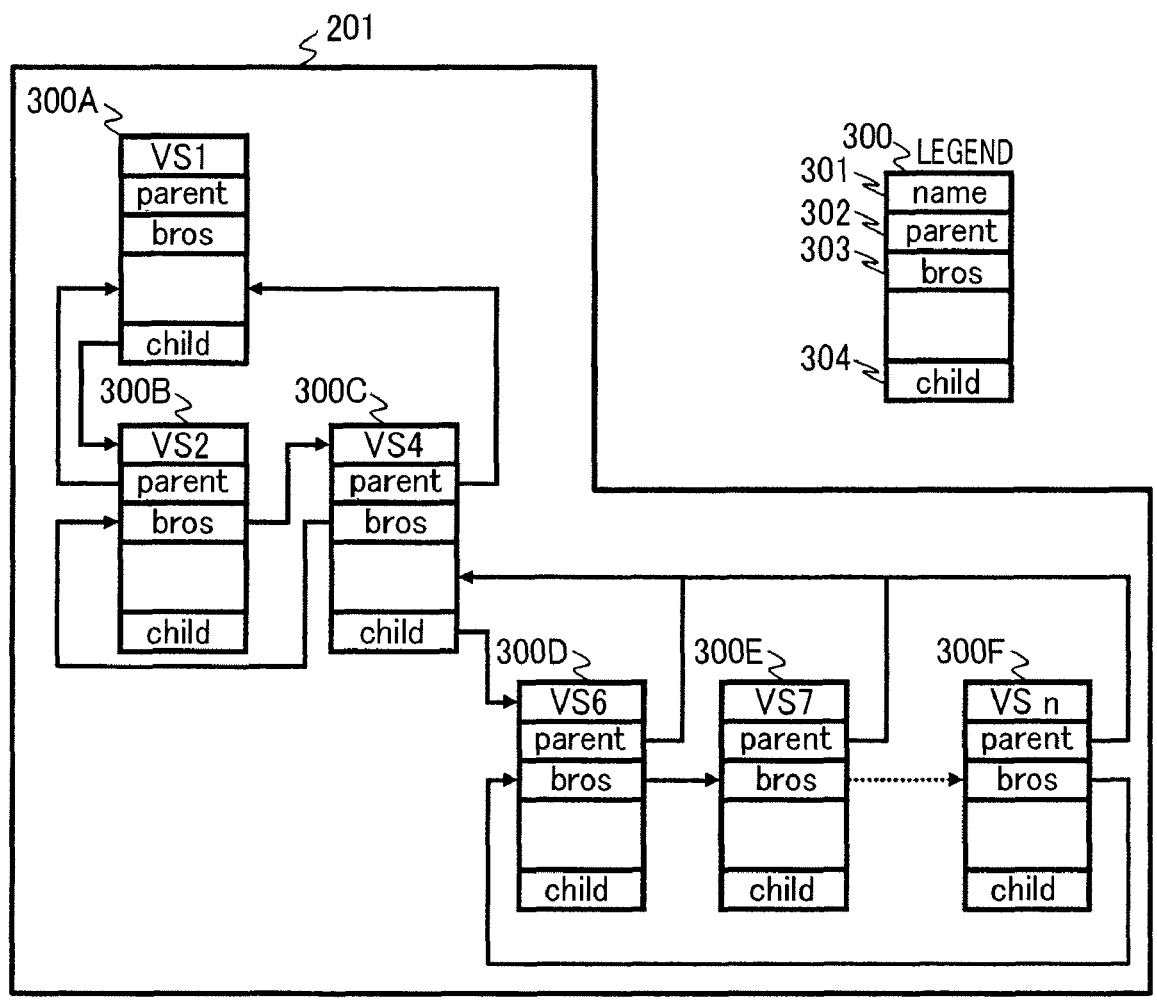
FIG. 3 illustrates hierarchization management information.

The hierarchization management information 201 is information for managing parent-child relationships among VSs to allow hierarchical management of the VSs. FIG. 3 shows an exemplar implementation form of the hierarchization management information 201.

The resource management information 202 is a table for managing usable resources for each VS 220. In the present invention, hardware resources necessary for the VS 220 to provide a file sharing service and the like to the client 110 are simply referred to as a "resource." More specifically, a resource in the present invention refers to one or more of, or all of the NIC 104, the CPU 106, the file cache 223 and the volume 133. Moreover, although not a physical component, an IP address is assumed to be a logical resource assigning a finite number to the file server 100, and is thus treated as part of the resource. Incidentally, an IP address is assumed to be set by the management computer 120, and the file server 100 stores the set result in the local memory 107. FIG. 4 shows details of the resource management information 202.

In response to an instruction from a management program 230 on the management computer 120, the VS creation/deletion processor 203 operates the hierarchization management information 201, operates the resource management information 202, loads the file request processing program 222 to the VS 220, or creates/deletes a data structure of a VS 220.

For example, when the administrator requests creation of the VS 220 by use of the management program 230 on the management computer 120, the VS hierarchization management program 200 receives the request and executes the VS creation/deletion processor 203. The request includes resource information such as that indicating which VS 220 (parent VS 220) should manage the new VS 220 (child VS 220), an identifier of the NIC 104 to lend to the child VS 220, an identifier of the volume 133, a file cache 223 amount, and an identifier (or split ratio) of the CPU 106.

The VS creation/deletion processor 203 operates the resource management information 202 on the basis of the resource information, so that the resource included in the request is changed from a resource usable by the parent VS 220 to a resource usable by the child VS 220. The VS creation/deletion processor 203 also adds an entry for management of the child VS 220 to the hierarchization management information 201 so that the parent-child relationship can be maintained.

Figure 6:
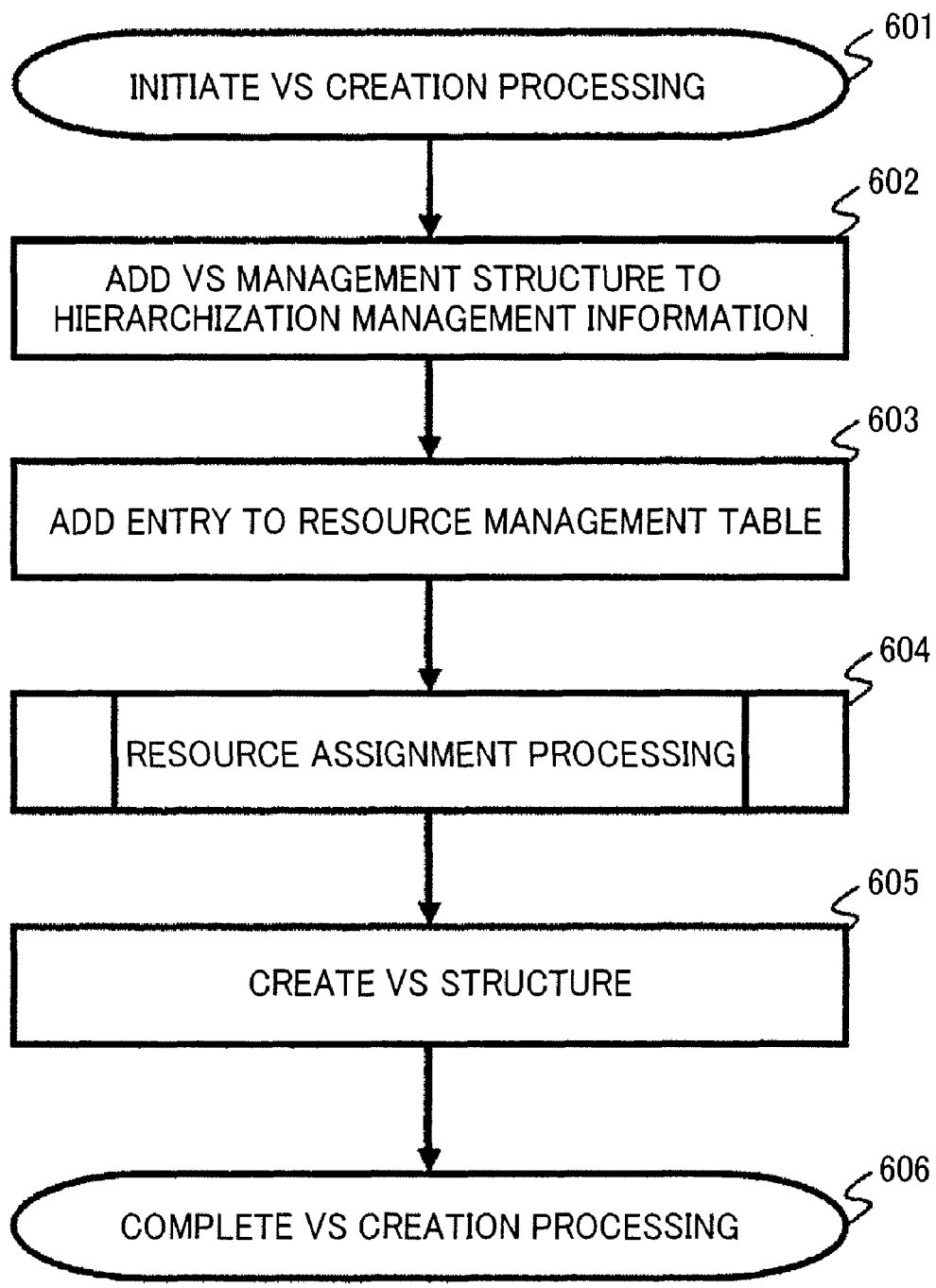
FIG. 6 is a flow chart illustrating creation processing of a virtual server.
Figure 8:
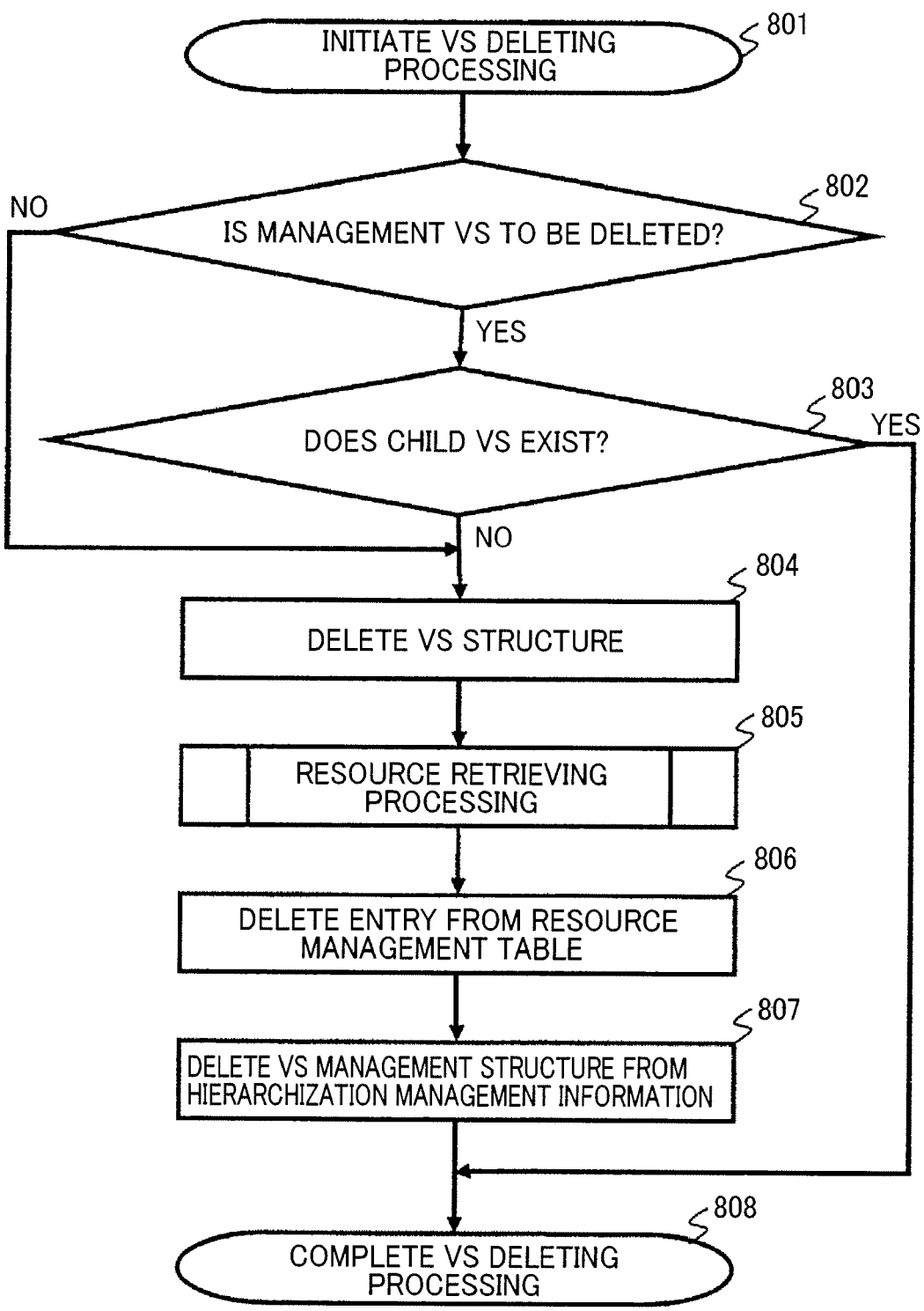
FIG. 8 is a flow chart illustrating deletion processing of a virtual server.

Subsequently, the VS creation/deletion processor 203 creates a routing table 221, a file cache 223 and mount information 224 on the local memory 107 in accordance with the request. Incidentally, the VS creation/deletion processor 203 may load a program of the file request processing program 222 from the volume 133, to the local memory 107. FIGS. 6 and 8 illustrate actual processing flows of the VS creation/deletion processor 203.

Figure 7:
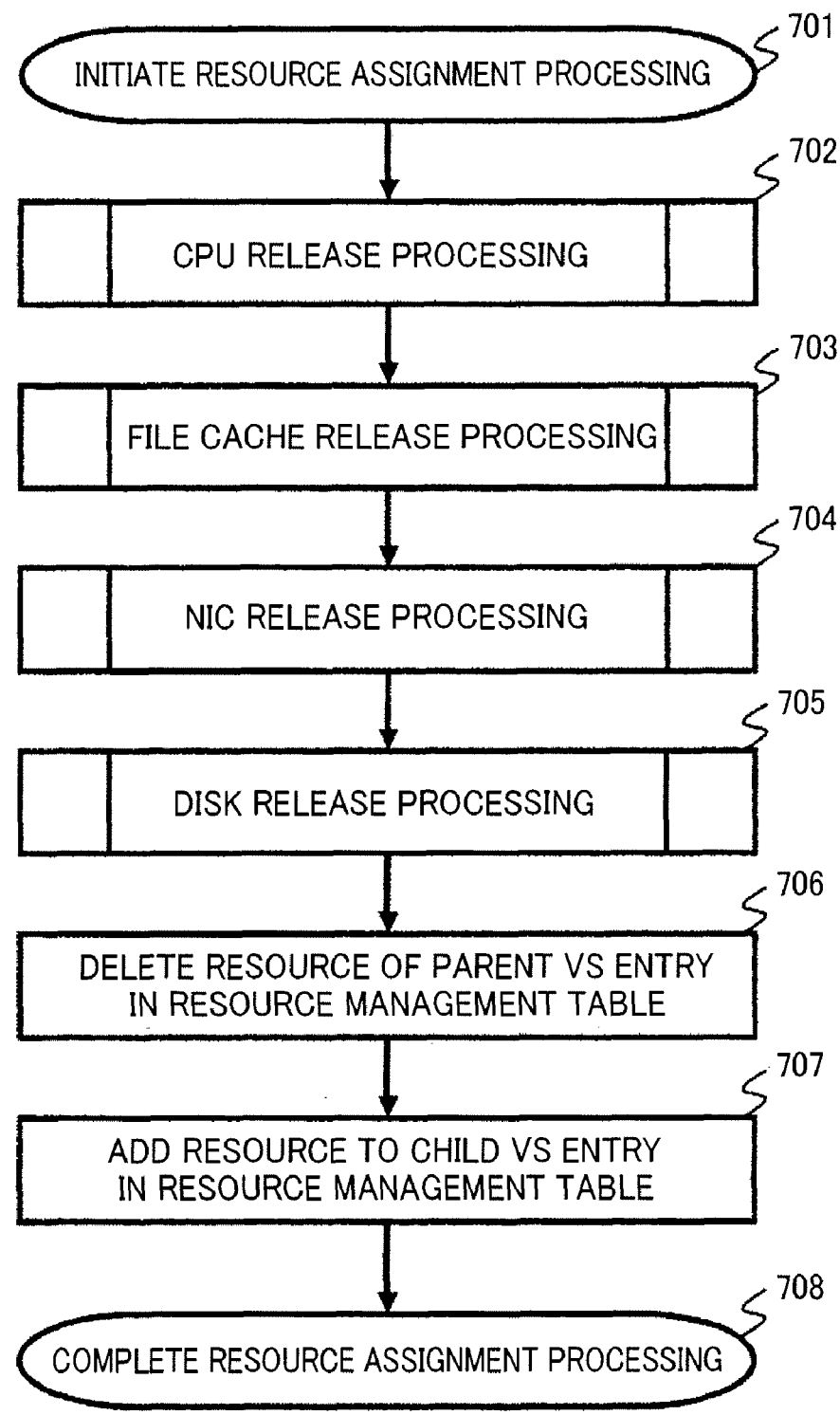
FIG. 7 is a flow chart illustrating resource assignment processing.
Figure 9:
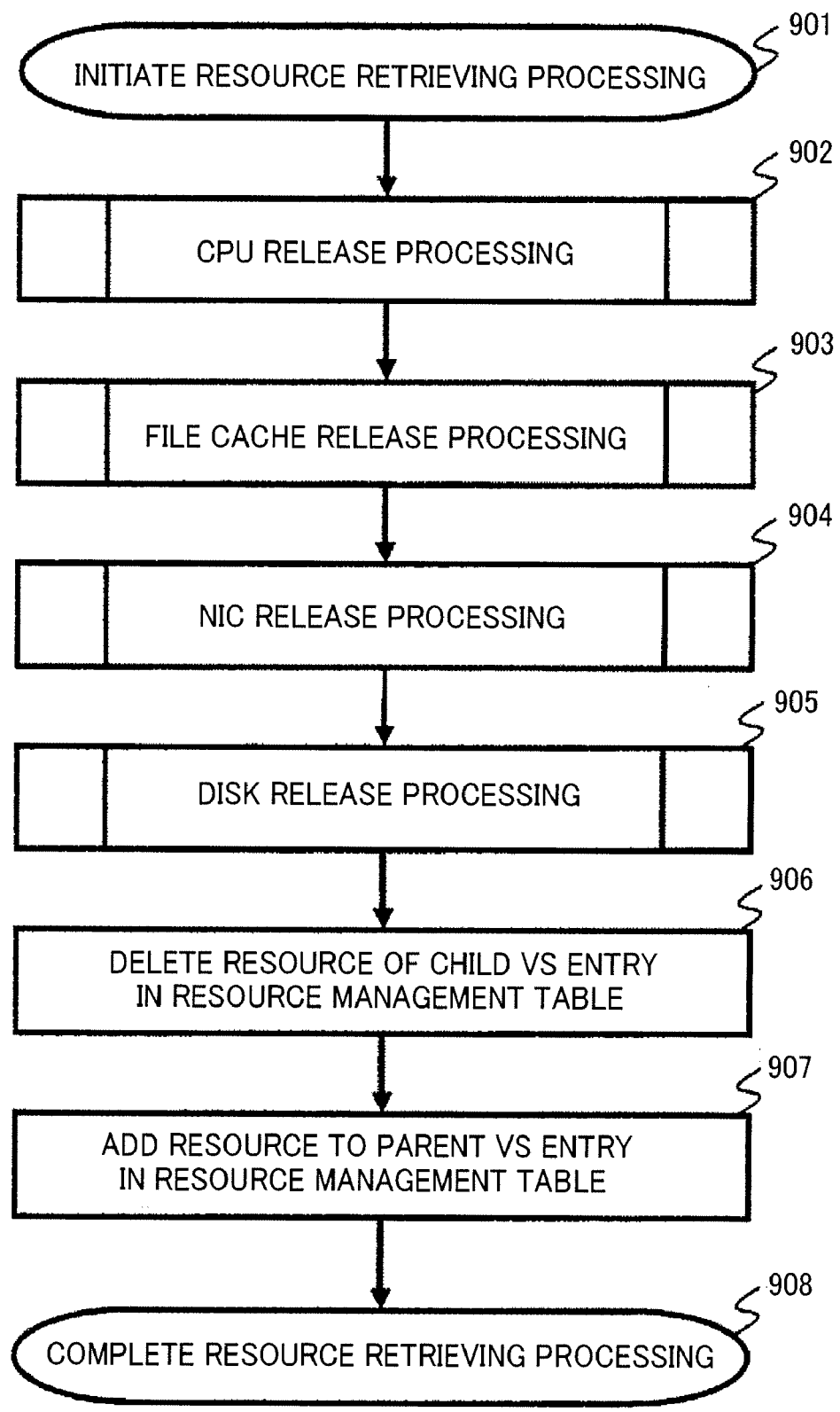
FIG. 9 is a flow chart illustrating resource retrieving processing.

The resource assignment/retrieving processor 204 lends a resource to an existing VS 220 or collects a resource from an existing VS 220 according to an instruction from the management program 230 on the management computer 120. FIGS. 7 and 9 show details of the resource assignment/retrieving processor 204.

A VS scheduler 205 selects the CPU 106 for executing the file request processing program 222 to provide each VS 220 from among multiple CPUs 106. The VS scheduler 205 can determine the CPU 106 that can be used by each VS 220 by referring to the resource management information 202.

The local memory 123 of the management computer 120 stores therein the management program 230.

In response to an instruction from the administrator, the management program 230 gives an instruction to the VS hierarchization management program 200 on the file server 100. Specifically, the management program 230 gives a request for creating a VS, deleting a VS, assigning a resource to a VS and retrieving a resource from a VS. FIGS. 10, 11, 12 and 13 show examples of management by use of the management program 230.

Here, by use of FIGS. 1 and 2, a description will be given for an overall flow of a case where the client 110A makes a request for reading a file to a file sharing service (file request processing program 222A) provided by the VS 220A.

The read request from the client 110A is received by the NIC 104A of the file server 100 through the LAN 101A.

The file request processing program 222A periodically checks the usable NIC 104A stored in the resource management information 202, to receive the file reading request from the client 110A.

Then, the file request processing program 220A checks whether data of the file to be read is stored in the file cache 223A.

If the data of the file to be read is not stored in the file cache 223A, the file request processing program 222A reads the file data from the volume 133 corresponding to the identification information stored in the mount information 224A, and stores the data in the file cache 223A. Subsequently, the file request processing program 222A reads the file data from the file cache 223A. Having read the file data from the file cache 223A, the file request processing program 222A returns the requested file data to the client 110 through the LAN 101A, by use of the NIC 104 corresponding to the identification information stored in the routing table 221A.

Next, by use of FIGS. 1 and 2, a description will be given on an overall flow of a case where the client 110A gives a request for writing to a file to a file sharing service provided by the VS 220A.

The writing request and data of the file to be written transmitted by the client 110A are received by the NIC 104 of the file server 100 through the LAN 101A. The file request processing program 222A periodically checks the NIC 104A corresponding to the identification information stored in the resource management information 202, to receive the writing request and the data of the file to be written from the client 110A. Then, the file request processing program 220A checks whether data of the file of the writing request is stored in the file cache 223A. If the data of the file for which the writing request is made is not stored in the file cache 223A, the file request processing program 222A reads the file data from the volume 133 corresponding to the identification information stored in the mount information 224A, and stores the data in the file cache 223A.

Subsequently, the file request processing program 222A updates the data in the file cache 223A. Then, the file request processing program 222A updates the file data in the volume 133 corresponding to the identification information stored in the mount information 224A by use of the data in the file cache 223A.

Having written the file data to the volume 133, the file request processing program 222A notifies the client 110 that the writing of the file data is completed, through the LAN 101A. At this time, the file request processing program 222A uses the NIC 104 corresponding to the identification information stored in the routing table 221A.

In the present embodiment, a configuration is employed where each VS 220 has a different routing table 221, mount information 224 and the like. However, note that the present invention can be implemented by employing other configurations where the VSs 220 share the same routing table 221 and mount information 224.

FIG. 3 shows the hierarchization management information 201.

The hierarchization management information 201 has a data structure for allowing hierarchical management of VSs 220 by managing parent-child and sibling relationships among the VSs 220. FIG. 3 has a data structure indicating parent-child relationships among six VSs.

Each of 300A to 300F is a VS management structure 300 that manages information of each VS 220. A name of a certain VS is stored in name 301. A pointer to a VS that created the certain VS (a parent VS 220) is stored in parent 302. A pointer to a VS 220 having the same parent VS 220 as the certain VS 220 (a sibling VS 220) is stored in bros 303, and the sibling VSs 220 form a circular list by the bros 303.

A pointer to a VS 220 created by the certain VS 220 (a child VS 220) is stored in child 304. If the certain VS 220 does not have a child VS 220, no information is stored in child 304. The VS management structure 300 stores therein other information for managing the VSs 220, in addition to the pieces of information 301 to 304.

Here, a pointer refers to an address indicating a position of the VS management structure 300 in the local memory 107. For instance, a pointer of parent 302 indicates a position in the local memory 107 stored in the VS management structure 300 of a parent VS 220, and thus information of the VS management structure 300 of the parent VS 220 can be referred to. In other words, the hierarchization management information 201 is a group of VS management structures 300 dispersed in the local memory 107, and has a structure in which the VS management structures 300 can trace each other's information by use of pointers.

In the case of adding a VS management structure 300 to the hierarchization management information 201, the VS creation/deletion processor 203 stores the name of the VS in name 301, stores a pointer of a parent VS 220 in parent 302, and stores a pointer to a sibling VS 220 in bros 303 if a sibling already exists. Note that the VS creation/deletion processor 203 always creates the pointer of bros 303 such that a circular list is formed among the sibling VSs 220.

For example, in the case of creating a child VS of 300C, the VS creation/deletion processor 203 stores a pointer of the child VS 220 in child 304C, stores a pointer of 300C in parent 302 of the child VS 220, and stores a pointer of 300D in bros 303 of the child VS 220.

On the other hand, in the case of deleting a VS management structure 300 from the hierarchization management information 201, the VS creation/deletion processor 203 carries out the processing without breaking the circularly-linked list of sibling VSs 220 formed by bros 303. For instance, when deleting 300D, the VS creation/deletion processor 203 stores a pointer of 300E in child 304C of 300C, and performs modification such that a pointer to 300E is stored in bros 303F of 300F.

Hereinabove, a description has been given of operations of the hierarchization management information 201. Note that the hierarchization management information 201 may have a data structure different from that described above, as long as it is capable of storing parent-child relationships among the virtual file servers. In addition, in the case of a virtual file server directly created by the file server 100, the file server 100 may be regarded as the parent of this virtual file server.

FIG. 4 shows the resource management information 202.

The resource management information 202 is a table for managing resources held by respective VSs 220.

Each of rows 411 to 416 of the table indicates resources managed by each VS 220.

Names (or identifiers) of VSs for specifying the VSs 220 are stored in a name column 401.

Flags indicating whether or not a VS 220 is a management VS 220 are held in a management flag column 402. If the management flag column 402 is ticked, the VS 220 is a management VS 220. If not, the VS 220 is a normal VS 220. The management VS 220 can create a new VS 220 by assigning a part of the resource that the management VS 220 manages. Multiple management VSs 220 may exist in a single file server 100. The management VS 220 can create a new VS 220 as a management VS 220. Moreover, a normal VS 220 may be changed into a management VS 220 by a request from the management program.

Identifiers of NICs 104 usable by the VSs 220 are indicated in a NIC column 403. Incidentally, the column may otherwise store therein IP addresses (or identifiers by which the IP addresses can be identified) respectively assigned to the VSs 220 for provision of the file sharing service, or IP addresses (or identifiers by which the IP addresses can be identified) respectively lent by the VSs 220 when a child VS 220 is created.

Identifiers of the volumes 133 usable by the respective VSs 220 are indicated in a Disk column 404. Note that if the unit to be used for the division for the VSs 220 is a region other than a volume (such as a partition being a sub-region into which a volume is divided, and a case of creating a file system for a volume and allocating a specific directory as well as lower directories to a specific VS 220), it suffices that identifiers of the region to be divided, other than the volume identifiers, are indicated. In other words, a file system is created for multiple volumes, and the regions to be lent and used by the VSs 220 correspond to namespaces of files in a specific directory and lower directories.

Incidentally, in such a division method (or assignment method) using directories, two types of regions are defined at the time of creation and update of files instead of at the time of a division, so that the regions mixedly exist in the volume. The regions include: a region in a volume where files created by a specific VS 220 are stored in a directory specified as a division point and in lower directories; and a region in the volume where files created by another VS 220 are stored in a higher directory than the directory specified as the division point. Accordingly, the above-mentioned correspondence between the regions and namespaces of files in the specific directory and lower directories in the file system means that the files and directories to be created by a file request will be created in the specific directory and lower directories.

When a file system is created, metadata of each file (storing attributes of the file and an address in the volume where the data of the file is stored) is assumed to be stored in one or more continuous regions in the volume. In this case, multiple pieces of metadata are stored in a block being the unit of reading and writing from and to the volume, and thus sometimes metadata of files created by different VSs 220 mixedly exist in a single block. Accordingly, data corresponding to files may be stored in the file cache regions corresponding to the respective VSs 220, while metadata may be cached to a region common to multiple VSs 220.

On the other hand, if a program for managing the file system performs control so that a metadata-related file to be stored in a block corresponds to a single VS 220 (in other words, performs processing for preventing multiple pieces of metadata related to files created by multiple VSs 220 to be stored in a single block), metadata may be stored in a file cache region corresponding to the VS 220. Incidentally, metadata may be cached by use of a file cache region corresponding to the VS 220 or a region common to multiple VSs 220, for reasons other than those described above. Hereinafter, if not specified otherwise, a sub-region of a volume is assumed to be each region in the volume, a partition, and a specific directory and lower directories.

Identifiers of CPUs 106 usable by the VSs 220 are indicated in a CPU column 405. In the case of a multi-core CPU in which a single CPU 106 has multiple CPU circuit cores, the resource management information 202 may manage the CPU 405 column by core units of the CPUs 106. Otherwise, in the case of sharing a specific CPU among multiple VSs 220 by time division, parameters related to time division may be included in the column.

Sizes (thresholds) of the file cache 223 usable by the VSs 220 are indicated in a file cache column 406. Incidentally, if a memory constituting the file cache is configured of multiple pieces of hardware, identifiers of the hardware may be included in the column.

"Share" is filled in to some of the cells of the CPU 405 column and the file cache column 406. This indicates that a parent VS 220 and a child VS 220 share a resource.

When using the resources indicated in the columns 403 to 406, each VS 220 refers to the resource management information 204 to determine whether the resource is usable. For example, the VS 220 refers to the resource management information 204 to perform processing (scheduling processing) for determining the CPU 106 to execute processing of the VS 220. As another example, when reading a file for processing of the VS 220, the VS 220 determines whether or not the file cache 223 is overused. If the file cache 223 is overused, the file is read after rewriting dirty data to a volume, for example.

Note that the resources to be managed by the resource management information 204 are not limited to the aforementioned NIC 104, volume 133, CPU 106, and file cache 223. The data structure of the resource management information 204 does not necessarily need to be a table, and other data structures may be used as long as the above information can be stored. Additionally, in the case of sharing, instead of distributing, some of the resources shown in the columns 403 to 406 among multiple VSs 220, the columns of the resources do not need to be included in the resource management information 204.

FIG. 6 illustrates a processing flow of VS creation carried out by the VS creation/deletion processor 203. VS processing indicated by steps 601 to 606 is initiated when the file server 100 receives a creation request from the management program 230 for a child VS whose parent is set to be a certain management VS 220. Incidentally, the creation request specifies an identifier of a VS 220 to become the parent, and an identifier related to a resource which is part of a resource lent to the parent VS 220 and which is to be lent to the child VS 220.

(Step 601) The VS creation/deletion processor 203 initiates the processing by using the information specified by the request as an input.

(Step 602) The VS creation/deletion processor 203 registers the VS management structure 300 of a child VS 220 (that is, a correspondence relationship between an identifier of the child VS 220 to be created and that of a parent VS 220) to the hierarchization management information 201. For instance, in the case of registering a VS 220 as a child VS 220 of VS 4 (300C) in FIG. 3, the VS creation/deletion processor 203 stores the name of the child VS 220 in 301, a pointer of 300C as the parent VS 220 in 302, and a pointer of 300D as a sibling VS 220 in 303. Then, the VS creation/deletion processor 203 updates a pointer in 303F to a pointer to the VS management structure 300 of the newly-created child VS 220 (an address of the VS management structure 300 of the newly-created child VS 220 in the local memory 107). Thus, the VS 220 can be registered as a child VS 220 of VS 4 (300C).

(Step 603) The VS creation/deletion processor 203 additionally registers an entry of the child VS 220 in the resource management information 202. To be specific, in step 603, the VS creation/deletion processor 203 reserves a new row in the resource management information 202, fills in the name of the VS 220 to the name column 401, and fills in information on whether or not to set the VS to be a management VS to the management flag column 402.

(Step 604) The VS creation/deletion processor 203 assigns a resource to the child VS 220, which is resource assignment processing. Details will be shown in FIG. 7.

(Step 605) The VS creation/deletion processor 203 creates the routing table 221, the file cache 223 and the mount information 224 as a data structure of the VS 220. Incidentally, the file request processing program 222 may simultaneously be loaded to the local memory 107 at this step.

(Step 606) The VS creation/deletion processor 203 returns a result to the management program 230 indicating that creation of the child VS 220 has been normally completed.

FIG. 7 is a diagram illustrating an operation flow of resource assignment processing carried out by the resource assignment/retrieving processor 204. The VS creation/deletion processor 203 carries out the processing to be described below at the following timings (A) and (B).

(A) When the file server 100 receives a resource assignment request from the management program 230. The assignment request specifies an identifier of a first VS 220 by which a resource is lent, an identifier of a second VS 220 to which the resource is lent, and an identifier of a part of resource lent from the first VS 220 to the second VS 220.

(B) When VS deletion processing calls the resource assignment processing. The processing is executed by use of information specified by the request received in FIG. 6.

(Step 701) The VS creation/deletion processor 203 receives information specified by the request received in FIG. 6.

(Step 702) The VS creation/deletion processor 203 causes a parent VS 220 to release the CPU 106 and waits for completion of the releasing. Details of step 702 will be shown in FIG. 14.

(Step 703) The VS creation/deletion processor 203 causes the parent VS 220 to release the file cache 223 and waits for completion of the releasing. Details of step 703 will be shown in FIG. 15.

(Step 704) The VS creation/deletion processor 203 causes the parent VS 220 to release the NIC 104 and waits for completion of the releasing. Details of step 704 will be shown in FIG. 16.

(Step 705) The VS creation/deletion processor 203 causes the parent VS 220 to release the volume 133 and waits for completion of the releasing. Details of step 705 will be shown in FIG. 17.

(Step 706) The VS creation/deletion processor 203 deletes information on a resource, registered in the resource management information 202, to be lent from the parent VS 220 to a child VS 220 from an entry of the parent VS 220. To be more specific, the VS creation/deletion processor 203 may search through the resource management information 202 by using the name of the parent VS 220 as a key, and delete the resource to be lent from the entry of the parent VS 220.

(Step 707) The VS creation/deletion processor 203 adds an identifier of the resource to be lent to the child VS 220, to an entry corresponding to the child VS 220. More specifically, the VS creation/deletion processor 203 may search through the resource management information 202 by using the name of the child VS 220 as a key, and add the resource to be lent to the entry of the child VS 220.

(Step 708) The VS creation/deletion processor 203 returns a result to the management program 230 indicating that the resource assignment processing has been normally completed.

Note that the above description has been made under the assumption that the parent VS 220 uses the resource lent to itself. However, in some cases a parent VS 220 may provide a file sharing service instead of using a part of a lent resource (such as when it is obvious that the resource will be lent to a child VS 220). In such cases, all or some of the release processing may be omitted.

FIG. 8 illustrates a processing flow of VS deletion carried out by the VS creation/deletion processor 203. The processing is initiated when the file server 100 receives a VS deletion request from the management program 230. Incidentally, the deletion request specifies an identifier of the VS 220 to be deleted (referred to as "deletion target VS 220" below).

(Step 801) The VS creation/deletion processor 203 receives information specified by the request as an input.

(Step 802) The VS creation/deletion processor 203 judges whether or not the deletion target VS 220 is a management VS, and executes step 804 if the deletion target VS 220 is not a management VS 220. If the deletion target VS 220 is a management VS 220, the VS creation/deletion processor 203 executes step 803. In making this judgment, the VS creation/deletion processor 203 may look up the resource management information 202 by using the name of the deletion target VS 220 as a key, and refer to the management flag column 402 to judge whether or not the deletion target VS 220 is a management VS 220.

(Step 803) The VS creation/deletion processor 203 judges whether or not the deletion target VS 220 has a child VS 220. If the deletion target VS 220 does not have a child VS 220, the VS creation/deletion processor 203 executes step 804. If the deletion target VS 220 has a child VS 220, the VS creation/deletion processor 203 executes step 808 to return an error indicating that the VS 220 cannot be deleted because it has a child VS 220. In order to judge whether the deletion target VS 220 has a child VS 220, the VS creation/deletion processor 203 searches through (traces the pointers in) the hierarchization management information 201 by using the name of the deletion target VS 220, and checks whether a pointer to the VS management structure 300 is stored in child 304. If a pointer to the VS management structure 300 is stored in child 304, this means that the deletion target VS 220 has a child VS 220.

(Step 804) The VS creation/deletion processor 203 deletes the routing table 221, the file cache 223, the mount information 224, and the file request processing program 222 of the deletion target VS 220 from the local memory 107 (or releases the region on the local memory 107 in which the information is stored).

(Step 805) The VS creation/deletion processor 203 collects a resource of the deletion target VS 220. Details of the resource retrieving processing will be shown in FIG. 9.

(Step 806) The VS creation/deletion processor 203 deletes the entry of the deletion target VS 220 from the resource management information 202. Specifically, the VS creation/deletion processor 203 may look up the resource management information 202 by using the name of the deletion target VS 220 as a key, and delete the corresponding row.

(Step 807) The VS creation/deletion processor 203 deletes the VS management structure 300 of the deletion target VS 220 registered in the hierarchization management information 201. More specifically, the VS creation/deletion processor 203 may search through the hierarchization management information 201 by using the name of the deletion target VS 220 as a key and delete the VS management structure 300 of the deletion target VS 220.

For instance, in the case of deleting VS 6 (300D) in FIG. 3, the following processes are carried out in step 807. Firstly, a pointer stored in child 304C of the VS management structure 300C is changed to a pointer to the VS management structure 300E. Then, a pointer stored in bros 303F of 300F is changed to a pointer to the VS management structure 300E. Moreover, the VS management structure 300D is deleted from the local memory 107. With this processing, the deletion target VS 6 (300D) can be deleted from the hierarchization management information 201.

(Step 808) The VS creation/deletion processor 203 returns a predetermined result to the management program 230. Note that if step 807 has been executed before this step 808, the predetermined result indicates normal completion of deletion of the child VS 220, whereas if step 803 has been executed before this step 808, the predetermined result indicates that the VS 220 cannot be deleted because it has a child VS 220.

Hereinabove, a description has been given of the processing flow of VS deletion. In the processing described above, deletion is forbidden when a child VS 220 exists. However, note that a VS 220 having a child VS 220 can be deleted by recursively carrying out the above processing.

FIG. 9 illustrates a processing flow of resource retrieving carried out by the resource assignment/retrieving processor 204. Here, the processing to be described below is carried out at the following timings (A) and (B).

(A) When the file server 100 receives a resource retrieving request from the management program 230. The retrieving request specifies an identifier of a VS 220 from which a resource is collected, and some of identifiers of resources lent to the VS 220 from which a resource is collected.

(B) When the VS deletion processing calls the resource retrieving processing. In this case, the deletion target VS 220 is regarded as the VS 220 to be collected (referred to as "retrieving target VS 220" below), and identifiers of all of the resources lent to the deletion target VS 220 are included.

(Step 901) The resource assignment/retrieving processor 204 initiates the processing by use of information obtained from each caller or request source.

(Step 902) The resource assignment/retrieving processor 204 causes the retrieving target VS 220 to release the CPU 106 and waits for completion of the releasing. Details of step 902 will be shown in FIG. 14.

(Step 903) The resource assignment/retrieving processor 204 causes the retrieving target VS 220 to release the file cache 223 and waits for completion of the releasing. Details of step 903 will be shown in FIG. 15.

(Step 904) The resource assignment/retrieving processor 204 causes the retrieving target VS 220 to release the NIC 104 and waits for completion of the releasing. Details of step 904 will be shown in FIG. 16.

(Step 905) The resource assignment/retrieving processor 204 causes the retrieving target VS 220 to release the volume 133 and waits for completion of the releasing. Details of step 905 will be shown in FIG. 17.

(Step 906) The resource assignment/retrieving processor 204 deletes, from an entry of the retrieving target VS 220, information on a specified resource among resources lent to the retrieving target VS 220, which are registered in the resource management information 202. More specifically, the resource assignment/retrieving processor 204 searches through the resource management information 202 by using the name of the retrieving target VS 220 as a key, and deletes the specified resource from the entry of the retrieving target VS 220.

(Step 907) The resource assignment/retrieving processor 204 adds an identifier of the resource collected from the retrieving target VS 220, to an entry corresponding to the parent VS 220 of the retrieving target VS 220. More specifically, the resource assignment/retrieving processor 204 searches through the resource management information 202 by using the name of the parent VS 220 of the retrieving target VS 220 as a key, and the collected resource to the entry of the parent VS 220.

(Step 908) The resource assignment/retrieving processor 204 returns a result to the management program 230 or to the caller indicating that the resource retrieving processing has been normally completed.

Figure 14:
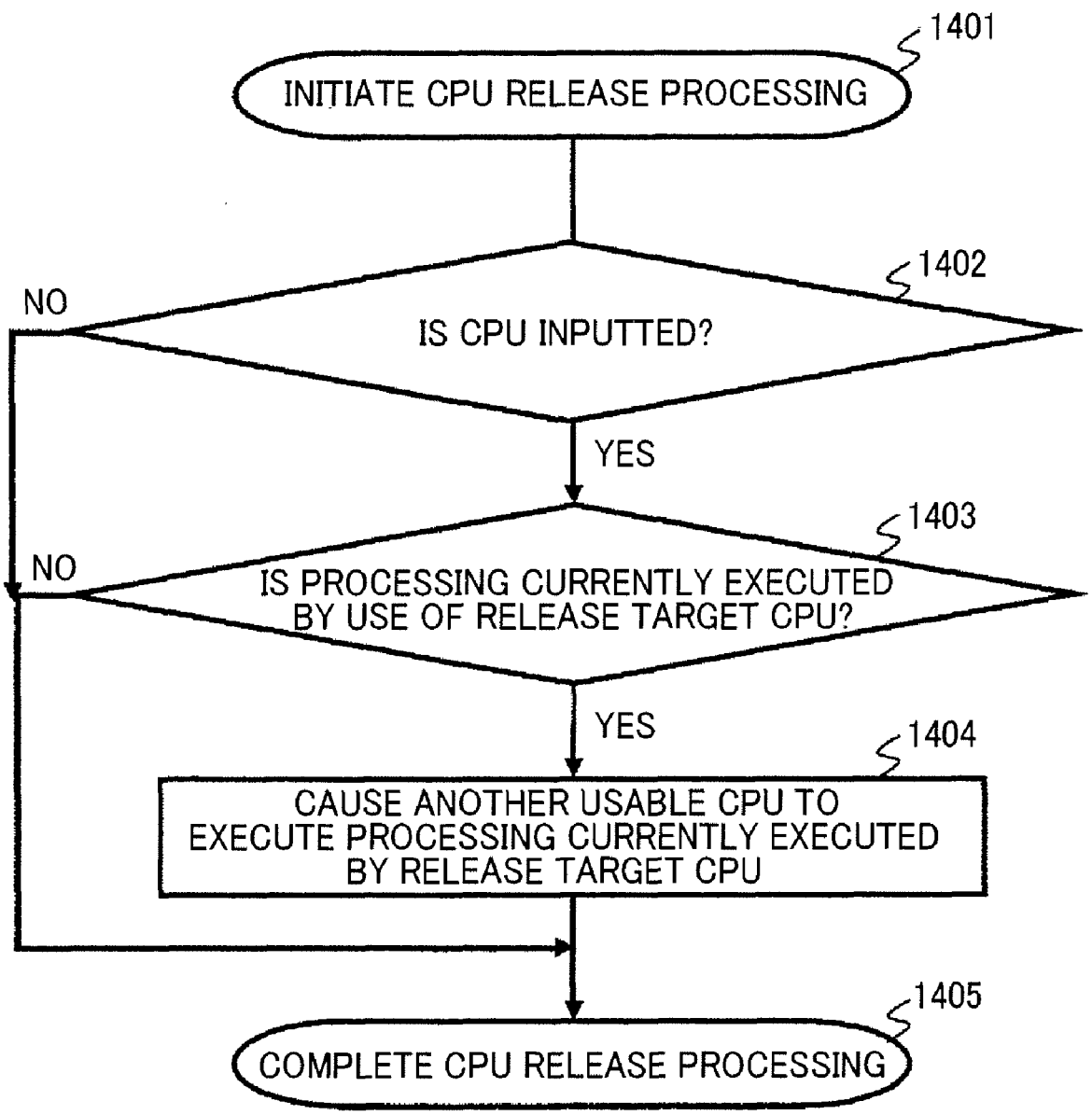
FIG. 14 is a flow chart illustrating CPU release processing.

FIG. 14 illustrates a CPU release flow carried out in the resource assignment/retrieving processor 204. Note that the processing is called by the processing flow of resource assignment (FIG. 7) or the processing flow of resource retrieving (FIG. 9).

(Step 1401) The resource assignment/retrieving processor 204 receives the name of a VS 220 that manages the CPU 106 to be released (referred to as "release target CPU 106" below) and an identifier of the release target CPU 106 as an input, and initiates the processing. Incidentally, if release of the CPU 106 is unnecessary, nothing is inputted in step 1401. Typically, if the processor is called by the processing of FIG. 8, all of the CPUs 106 assigned to the VS 220 are set as release targets. Meanwhile, if the processor is called by a resource retrieving request, all or some of the CPUs 106 assigned to the VS 220 are set as release targets.

(Step 1402) The resource assignment/retrieving processor 204 judges whether an identifier of the CPU 106 is inputted. If an identifier of the CPU 106 is inputted, the resource assignment/retrieving processor 204 executes step 1403, and if not, the resource assignment/retrieving processor 204 executes step 1405.

(Step 1403) The resource assignment/retrieving processor 204 checks whether the VS 220 managing the CPU 106 is currently using the CPU 106. If the CPU 106 is in use, the resource assignment/retrieving processor 204 executes step 1404, and if not, the resource assignment/retrieving processor 204 executes step 1405.

(Step 1404) The resource assignment/retrieving processor 204 causes an alternative CPU 106 to execute the file request processing program 222 which is currently executed by the release target CPU 106. The alternative CPU 106 is another CPU 106 managed by the VS 220 that is managing the release target CPU 106, and is determined by referring to the resource management information 202.

(Step 1405) The resource assignment/retrieving processor 204 returns a result indicating normal completion to the caller which is the resource assignment processing flow (FIG. 7) or the resource retrieving processing flow (FIG. 9).

Figure 15:
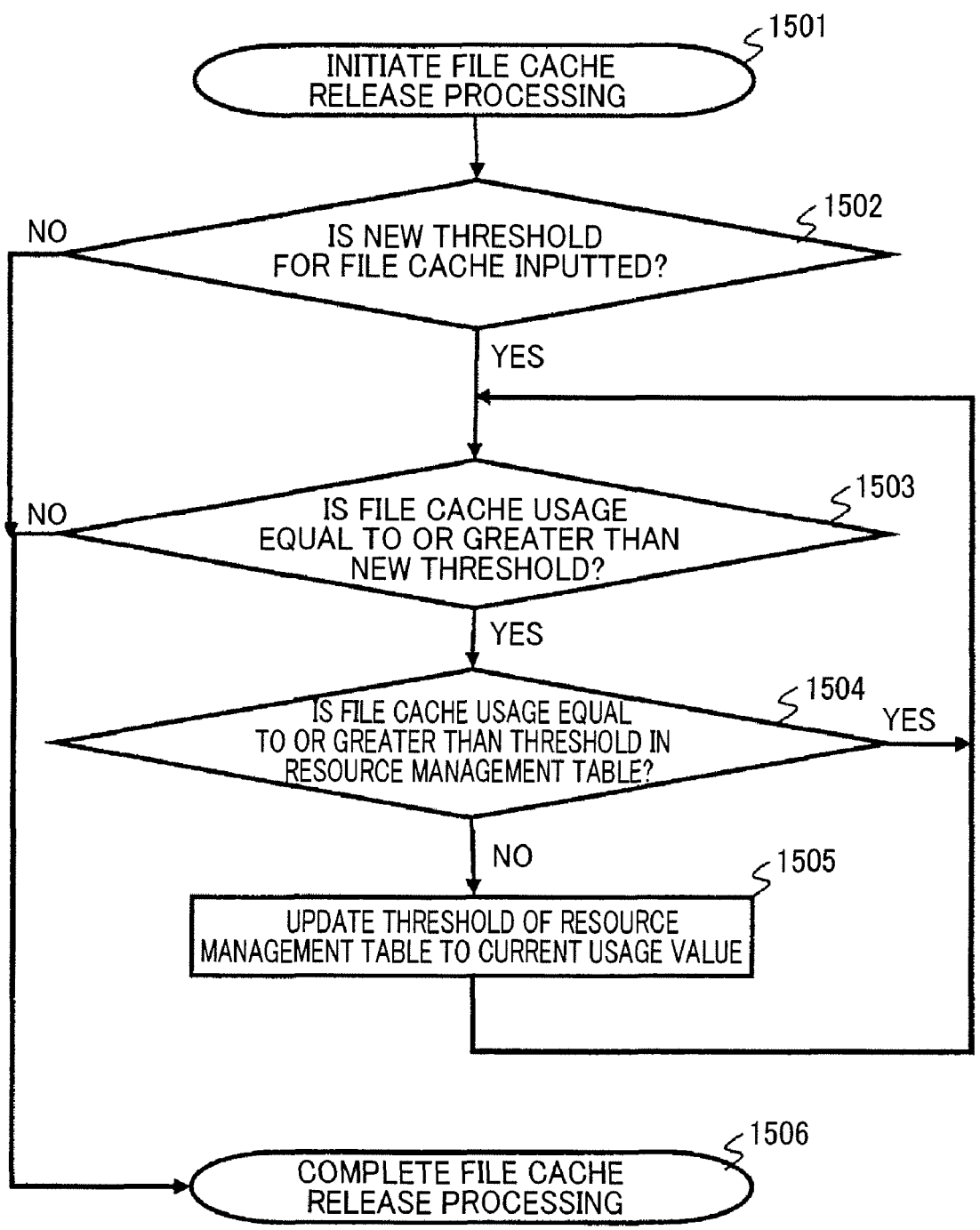
FIG. 15 is a flow chart illustrating file cache release processing.

FIG. 15 illustrates a file cache release flow carried out in the resource assignment/retrieving processor 204. The processing is called by the processing flow of resource assignment (FIG. 7) or the processing flow of resource retrieving (FIG. 9).

(Step 1501) The resource assignment/retrieving processor 204 receives the name of a VS 220 that manages the file cache 223 to be released (referred to as "release target file cache 223" below) and a new threshold of the file cache 223, and initiates the processing. Incidentally, if release of the file cache 223 is unnecessary, nothing is inputted in step 1501. Typically, if the processor is called by the processing of FIG. 8, all of the entire capacity (or a threshold) of the file cache related to the VS 220 is set as the release target. Meanwhile, if the processor is called by a resource retrieving request, the entirety or part of the capacity (or threshold) of the file cache related to the VS 220 is set as the release target.

(Step 1502) The resource assignment/retrieving processor 204 judges whether a new threshold of the file cache 223 is inputted. If a new threshold of the file cache 223 is inputted, the resource assignment/retrieving processor 204 executes step 1503, and if not, the resource assignment/retrieving processor 204 executes step 1506.

(Step 1503) The resource assignment/retrieving processor 204 judges whether the file request processing program 222 of the VS 220 managing the release target file cache 223 is currently using the file cache 223 for an amount equal to or greater than the inputted new threshold. As a result, if the file request processing program 222 is currently using the file cache 223 for an amount equal to or greater than the inputted new threshold, the resource assignment/retrieving processor 204 executes step 1504. If the file request processing program 222 is currently using the file cache 223 for an amount smaller than the inputted new threshold, the resource assignment/retrieving processor 204 executes step 1506.

(Step 1504) The resource assignment/retrieving processor 204 judges whether the file request processing program 222 is currently using the file cache 223 for an amount equal to or greater than a threshold of the file cache 223, stored in the resource management information 202. As a result, if the file request processing program 222 is currently using the file cache 223 for an amount equal to or greater than the threshold of the file cache 223 stored in the resource management information 202, the resource assignment/retrieving processor 204 executes step 1503. If the file request processing program 222 is currently using the file cache 223 for an amount smaller than the threshold of the file cache 223 stored in the resource management information 202, the resource assignment/retrieving processor 204 executes step 1505.

(Step 1505) In this step, the resource assignment/retrieving processor 204 updates the threshold of the file cache 223 stored in the resource management information 202 to the current usage value. Then, the resource assignment/retrieving processor 204 returns to step 1503.

Finally in step 1506, the resource assignment/retrieving processor 204 returns a result indicating normal completion to the caller which is the resource assignment processing flow (FIG. 7) or the resource retrieving processing flow (FIG. 9).

According to a caching algorithm, the file cache 223 writes data received and written by the file request processing program back to a volume. In the caching algorithm, computation is performed on the basis of a capacity obtained by subtracting a predetermined ratio or a predetermined volume from the capacity of the file cache. Hence, by carrying out the loop of steps 1503 to 1505, the threshold of the file cache 223 in the resource management information 202 is gradually lowered in accordance with the amount of the file cache 223 used by the file request processing program 222. In the end, the threshold of the resource management information 202 is updated to the new threshold. By thus reducing the cache capacity in multiple steps in association with the caching algorithm, a sudden deterioration in the access performance of a client can be avoided. Accordingly, an administrator can easily request reduction in the file cache capacity.

Figure 16:
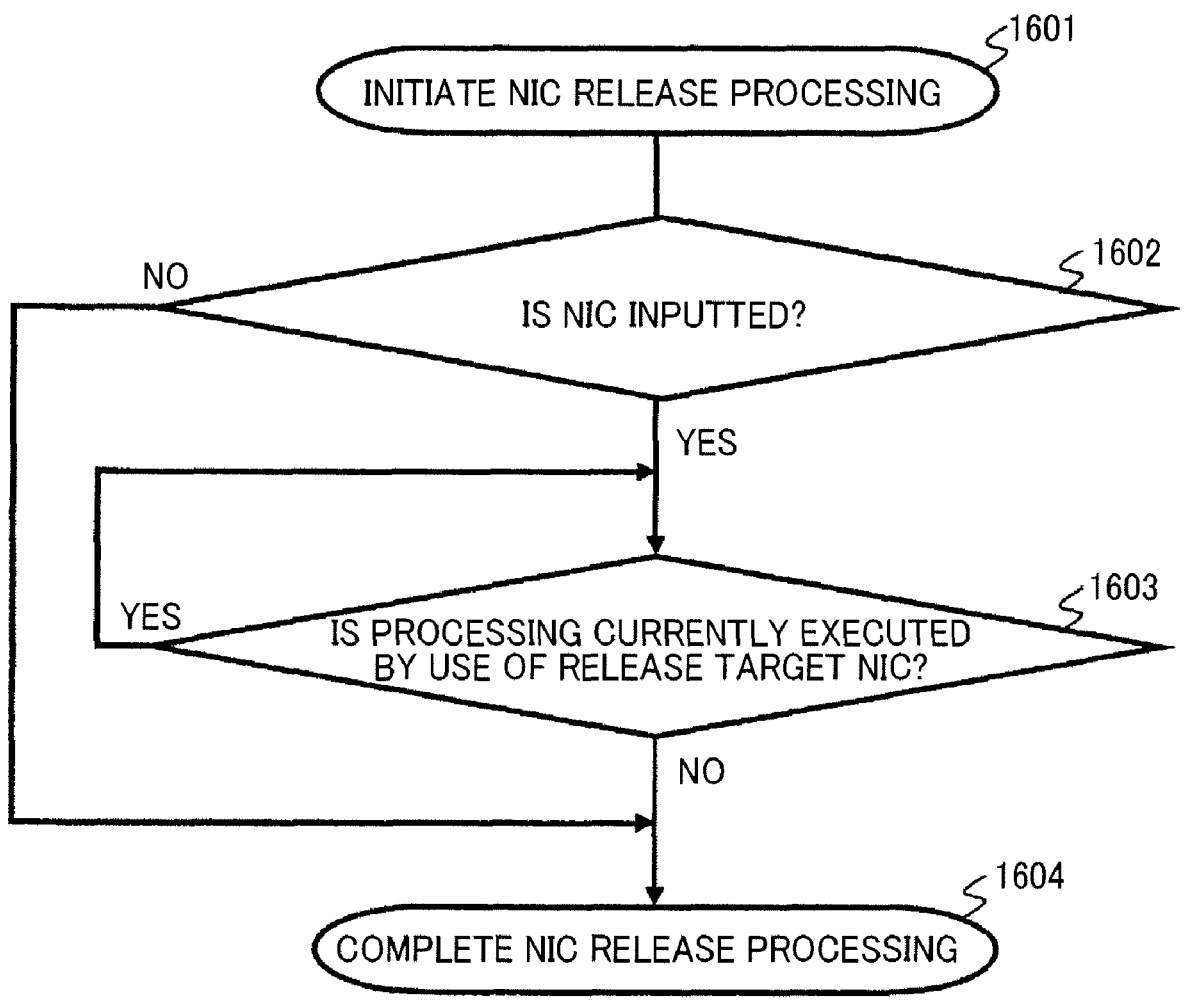
FIG. 16 is a flow chart illustrating NIC release processing.

FIG. 16 illustrates a NIC release flow carried out in the resource assignment/retrieving processor 204. The processing indicated by steps 1601 to 1604 is called by the processing flow of resource assignment (FIG. 7) or the processing flow of resource retrieving (FIG. 9).

(Step 1601) The resource assignment/retrieving processor 204 receives the name of a VS 220 that manages the NIC 104 to be released (referred to as "release target NIC 104" below) and an identifier of the release target NIC 104 as an input, and initiates the processing. Incidentally, if release of the NIC 104 is unnecessary, nothing is inputted in step 1601. Typically, if the processor is called by the processing of FIG. 8, all of the NICs 104 assigned to the VS 220 are set as release targets. Meanwhile, if the processor is called by a resource retrieving request, all or some of the NICs 104 assigned to the VS 220 are set as release targets.

(Step 1602) In this step, the resource assignment/retrieving processor 204 judges whether an identifier of the NIC 104 is inputted. If an identifier of the NIC 104 is inputted, the resource assignment/retrieving processor 204 executes step 1603, and if not, the resource assignment/retrieving processor 204 executes step 1604.

(Step 1603) The resource assignment/retrieving processor 204 checks whether the VS 220 managing the NIC 104 is currently using the NIC 104. If the NIC 104 is in use, the resource assignment/retrieving processor 204 repeats the processing in step 1603, and if not, the resource assignment/retrieving processor 204 executes step 1604.

(Step 1604) The resource assignment/retrieving processor 204 returns a result indicating normal completion to the caller which is the resource assignment processing flow (FIG. 7) or the resource retrieving processing flow (FIG. 9).

Figure 17:
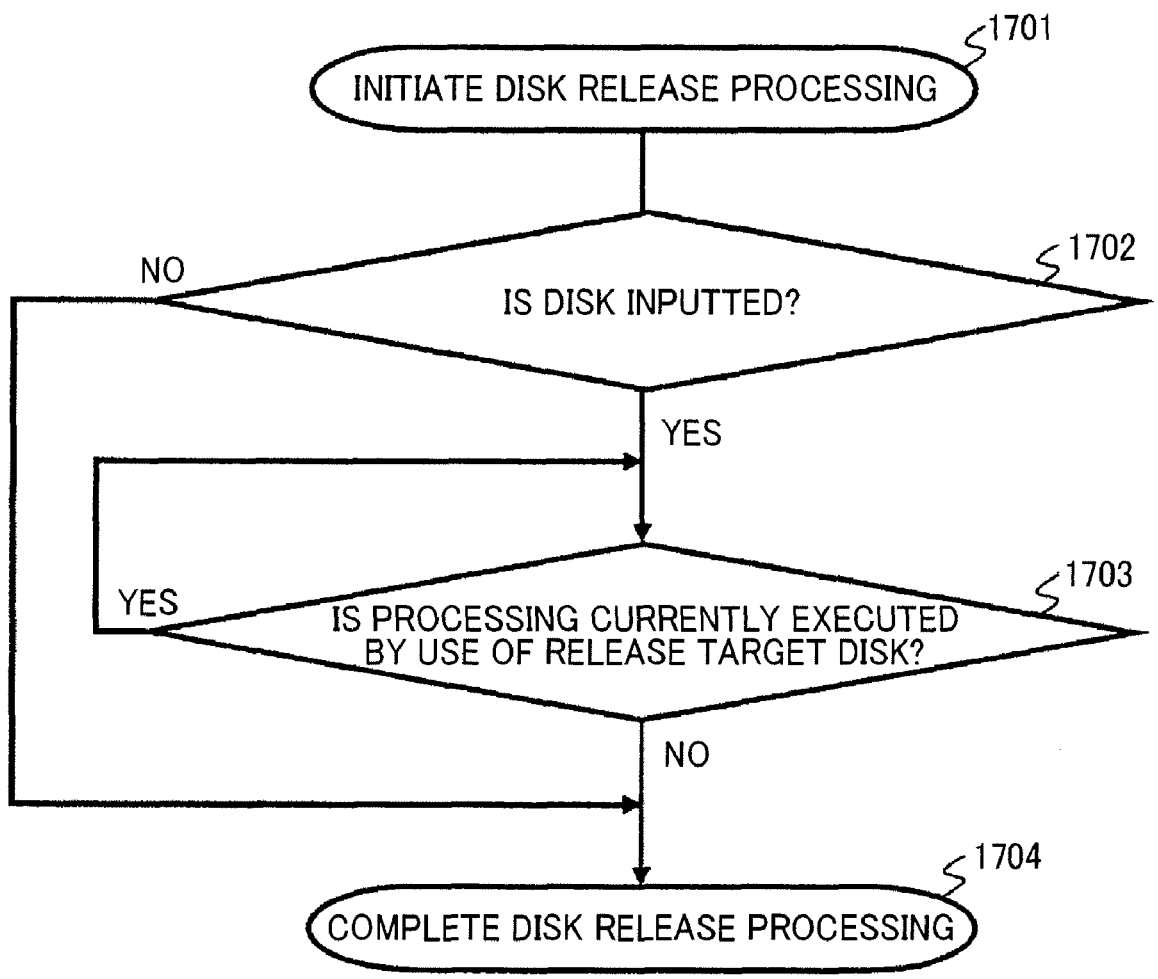
FIG. 17 is a flow chart illustrating volume release processing.

FIG. 17 illustrates a volume release flow carried out in the resource assignment/retrieving processor 204. The processing indicated by steps 1701 to 1704 is called by the processing flow of resource assignment (FIG. 7) or the processing flow of resource retrieving (FIG. 9).

(Step 1701) The resource assignment/retrieving processor 204 receives the name of a VS 220 that manages the volume 133 to be released (referred to as "release target volume 133" below) and an identifier of the release target volume 133 as an input, and initiates the processing. Incidentally, if release of the volume 133 is unnecessary, nothing is inputted in step 1701. Typically, if the processor is called by the processing of FIG. 8, the entire capacity (or a threshold) of the volume related to the VS 220 is set as the release target. Meanwhile, if the processor is called by a resource retrieving request, the entirety or part of the capacity of the volume related to the VS 220 is set as the release target.

(Step 1702) The resource assignment/retrieving processor 204 judges whether an identifier of the release target volume 133 is inputted. If an identifier of the volume 133 is inputted, the resource assignment/retrieving processor 204 executes step 1703, and if not, the resource assignment/retrieving processor 204 executes step 1704.

(Step 1703) The resource assignment/retrieving processor 204 checks whether the VS 220 managing the volume 133 is currently using the volume 133. If the volume 133 is in use, the resource assignment/retrieving processor 204 repeats the processing in step 1703, and if not, the resource assignment/retrieving processor 204 executes step 1704.

(Step 1704) The resource assignment/retrieving processor 204 returns a result indicating normal completion to the caller which is the resource assignment processing flow (FIG. 7) or the resource retrieving processing flow (FIG. 9).

Figure 12:
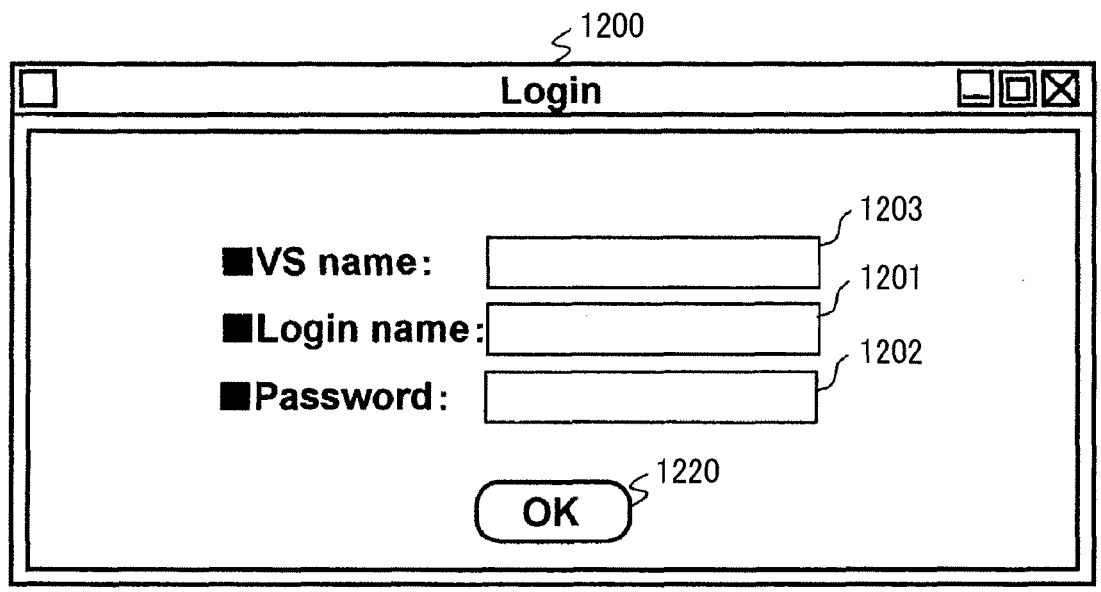
FIG. 12 is an exemplar login screen for using a management program.

FIG. 12 illustrates a login window 1200 displayed on the management screen 125 by the management program 230, which is executed by the CPU 122 on the management computer 120.

The administrator of the file server 100 or the VS 220 can create or delete a VS 220, for example, through the management program 230 by inputting a VS 220 to be authenticated (referred to as "authentication target VS 220" below) and authentication information (user name and password), by use of the screen illustrated in FIG. 12.

The login window 1200 includes three input regions and a button. An input region 1201 is a region for inputting a login name. An input region 1202 is a region for inputting a password. An input region 1203 is a region for inputting an identifier of an authentication target VS 220. When an operator of the screen shown in FIG. 12 presses an "OK" button 1220 after inputting the login name 1201, the password 1202 and the identifier 1203 of the authentication target VS 220, the management program 230 authenticates the account. If the operator of the screen in FIG. 12 is authenticated as a system administrator of the file server 100 or an administrator of any VS 220, the management program 230 causes a VS management menu screen 1300, illustrated in FIG. 13, to be displayed on the management screen 125.

Figure 13:
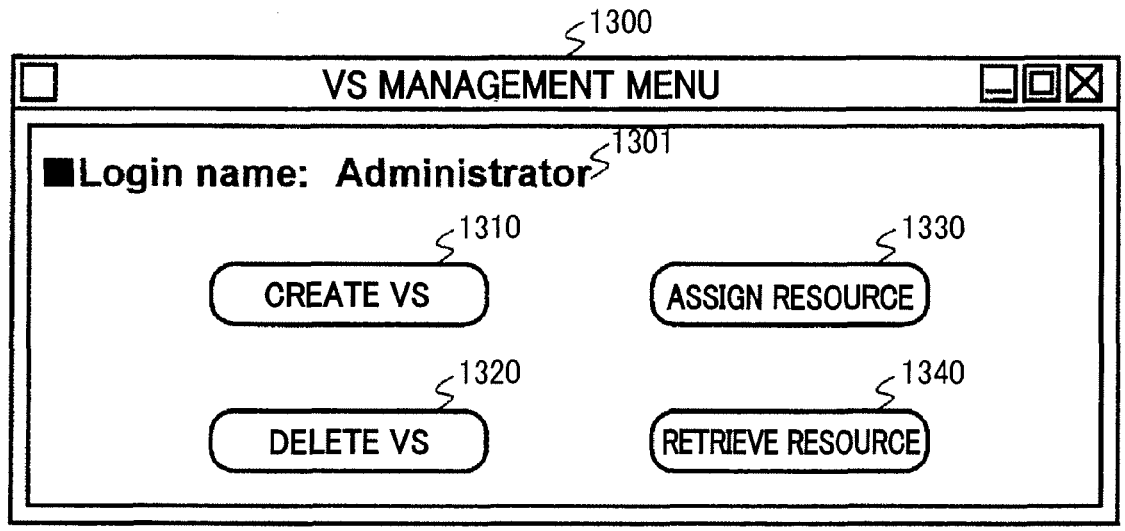
FIG. 13 is a management menu of a virtual server of the management program.

The VS management menu screen 1300 shown in FIG. 13 includes a display region 1301 for indicating the login name authenticated by the management program 230, and the following four buttons.

(A) A create VS button 1310 is a button by which the administrator gives an instruction to the file server 100 for creating a VS 220. When the administrator presses the create VS button 1310, the management program 230 allows input of an identifier of a parent VS 220, a name (or an identifier) of a child VS 220, flag information indicating whether or not to set the child VS to be a management VS, and information on resources to be divided from the management VS 220 (such as an identifier of a resource, setting information related to time division in the case of CPU, and setting information related to volume in the case of a file cache). According to the information inputted by the administrator, the management program 230 transmits, to the VS hierarchization program 200, a VS 220 creation request (referred to as "VS creation request" below) that designates the following elements. Specifically, the VS creation request designates the identifier of the child VS 220, flag information, the identifier of the resource to be divided, and the identifier of the parent VS 220 (an identifier of an authentication target management VS 220 or an identifier of a VS 220 previously created by the authentication target management VS 220). The VS hierarchization program 200 executes the VS creation/deletion processor 203 on the basis of the request.

(B) An delete VS button 1320 is a button by which the administrator gives an instruction to the file server 100 for deleting a VS 220. When the administrator presses the delete VS button 1320, the management program 230 allows the administrator to designate the VS 220 to be deleted (referred to as "deletion target VS 220" below). According to the information inputted by the operator of the screen, the management program 230 transmits, to the VS hierarchization program 200, a VS deletion request that designates the identifier of the deletion target VS 220. The VS hierarchization program 200 executes the VS creation/deletion processor 203 on the basis of the request.

(C) A lend resource button 1330 is a button by which the administrator gives an instruction to the file server 100 for adding a resource to a VS 220. When the administrator presses lend resource button 1330, the management program 230 allows the administrator to designate the management VS 220 by which the resource is lent and the child VS 220 to which the resource is lent. Moreover, the management program 230 allows the administrator to input information on the resource to be divided from the management VS 220 and be assigned to the child VS 220. Note that the resource to be lent may either be all of or some of the resources of the VS 220 by which a resource is lent. According to information inputted by the operator of the screen, the management program 230 transmits, to the VS hierarchization program 200, a resource assignment request that designates the identifier of the child VS 220, resource information, and the identifier of the management VS 220 which is currently serving as the VS 220 by which the resource is lent. The VS hierarchization program 200 executes the resource assignment/retrieving processor 204 on the basis of the request.

(D) A collect resource button 1340 is a button by which the administrator gives an instruction to the file server 100 for retrieving a resource from a VS 220. When the administrator presses the collect resource button 1340, the management program 230 allows the administrator to designate the VS 220 from which a resource is collected, and to input the resource to be collected. Note that the resource to be collected may either be all of or some of the resources of the VS 220 from which a resource is collected. According to information inputted by the administrator, the management program 230 transmits, to the VS hierarchization program 200, a resource retrieving request that designates the identifier of the VS 220 from which a resource is collected, and resource information. The VS hierarchization program 200 executes the resource assignment/retrieving processor 204 on the basis of the request.

Figure 10:
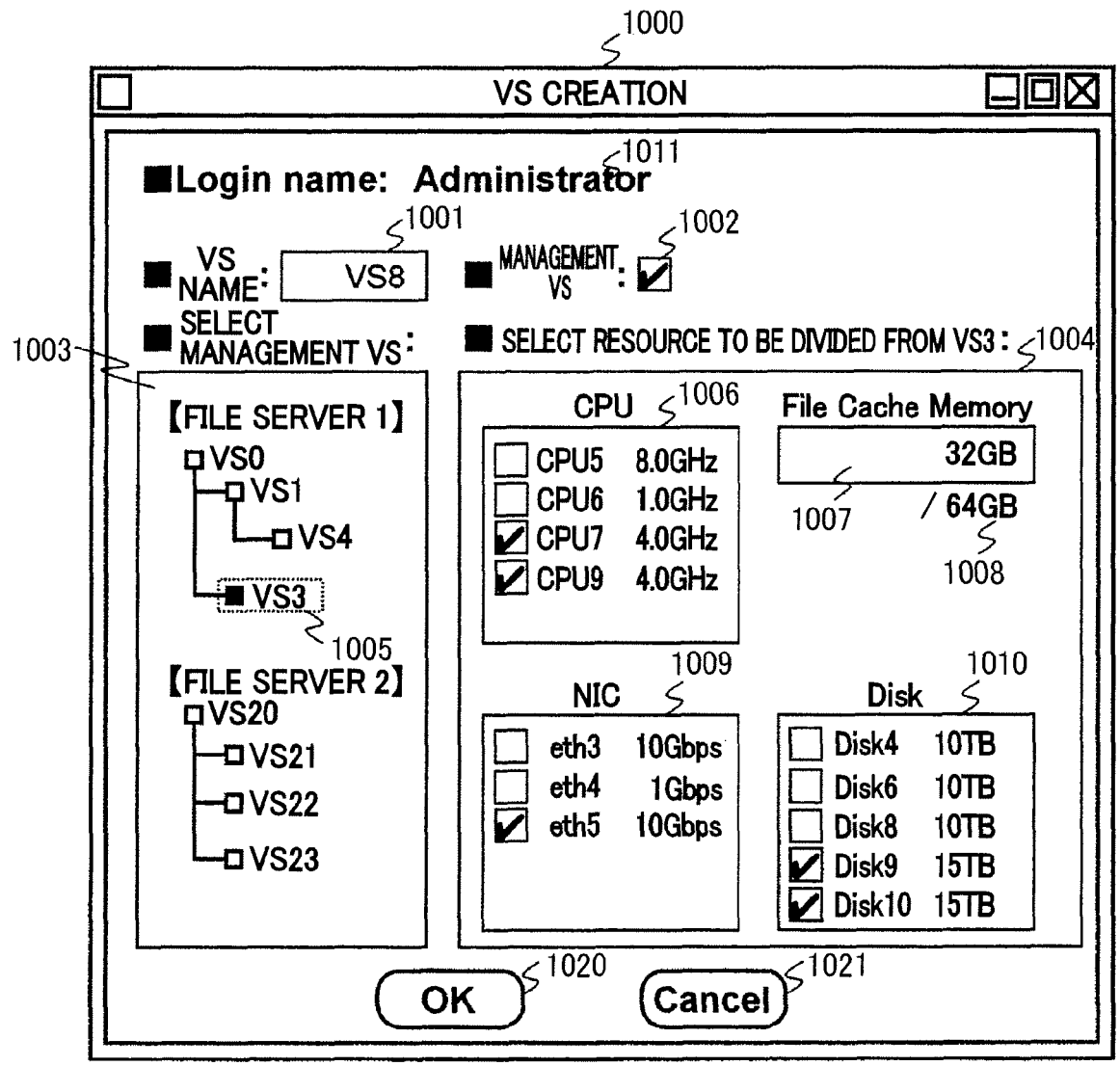
FIG. 10 is an exemplar management screen used by a system administrator for creating a virtual server.
Figure 11:
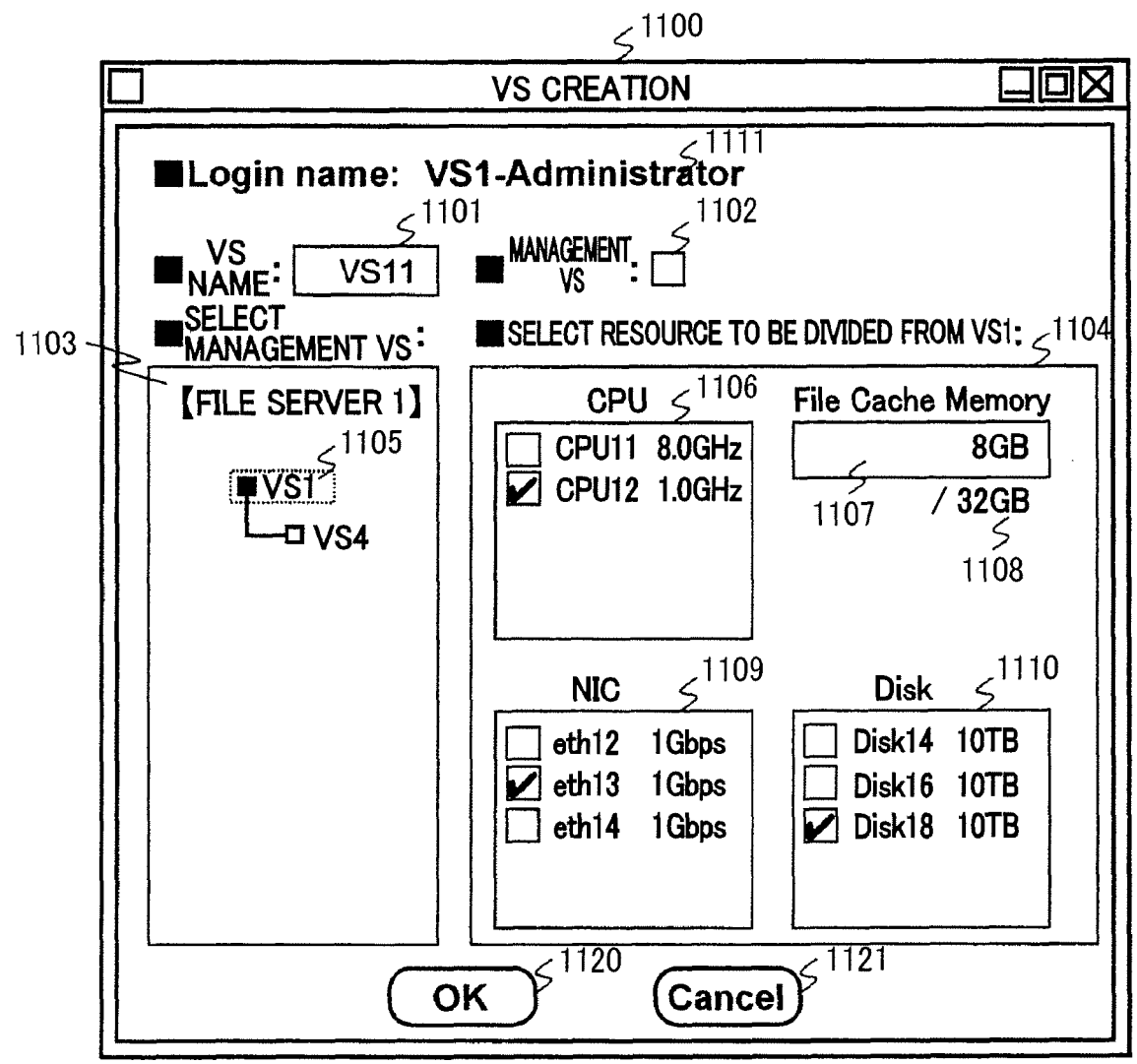
FIG. 11 is an exemplar management screen used by a VS1 administrator for creating a virtual server.

As an example of the management screen 125, FIGS. 10 and 11 illustrate states of the management screen 125 in the case where the operator of the screen presses the create VS button 1310 to create a child VS 220 by dividing a resource managed by a VS 220. Different management screens 125 are displayed depending on the authentication result of the logged-in operator of the screen.

When a system administrator presses the create VS button 1310, the management program 230 causes a VS creation screen illustrated in FIG. 10 to be displayed on the management screen 125.

Meanwhile, when an administrator of VS1 presses the create VS button 1310, the management program 230 causes a VS creation screen illustrated in FIG. 11 to be displayed on the management screen 125.

FIG. 10 illustrates a VS creation screen 1000 that the management program 230 displays on the management screen 125 when the system administrator of the file server 100 creates a VS 220. The authenticated user name (Administrator in FIG. 10) is displayed in an upper part 1011 of the VS creation screen 1000. Additionally, the VS creation screen 1000 includes four input items 1001 to 1004.

The input region 1001 is a text box for inputting the name of the new VS 220. FIG. 10 shows an example of creating a new VS 220 named VS 8. The input region 1002 is a check box for selecting whether or not to set the new VS 220 to be a management VS 220. If the system administrator ticks the box, the new VS 220 is created as a management VS 220.

The screen 1003 is a screen for selecting the management VS 220. When the administrator selects a management VS 220 in the screen 1003, the new VS 220 is created as a child VS 220 of the selected management VS 220. VS3 is selected in the example of FIG. 10 (1005). Here, the VS 220 can be selected from among the VS 220 to be operated and VSs 220 created by the VS 220 to be operated (and further, VSs 220 created by each of these created VSs 220 (hereinafter, the state where the VS 220 to be operated or the VS 220 created by the VS 220 to be operated creates a VS 220 will sometimes be expressed as "indirect creation")). As indicated in the screen 1003 as multiple management VS trees file server 1 and file server 2, the management program 230 may collectively manage multiple file servers 100 or multiple management VS trees of server computers.

Incidentally, processing carried out with this screen and the file server 100 only allows modification in settings of the login VS 220, VSs 220 created by the login VS 220 and VSs 220 indirectly created by the login VS 220. Modifications in other VSs 220 are prohibited, because it is problematic from the viewpoint of security and performance to allow an operation to be made on a VS 220 using a resource that is not managed by the login VS 220. The following prohibition measures are assumable.

(A) Display the VS 220 to be prohibited on the screen, but inhibit selection of the GUI. Otherwise, if the VS 220 to be prohibited is included in any of the aforementioned requests, reject the request.

(B) Does not display the VS 220 to be prohibited in the selectable items as in the screen of FIG. 10. This measure is more preferable from the viewpoint of security because the parent-child relationship of prohibited VSs 220 will not be displayed.

The screen 1004 is a screen by which the operator selects resources to be divided and lent from the management VS 220 selected in the screen 1003 to the new VS 220. In the example in FIG. 10, input items 1006, 1007, 1009 and 1010 respectively indicate four resources CPU, file cache amount, NIC and volume to be divided. In the items 1006, 1009 and 1010, the ticked resources are divided as the resources to be used by the new VS 220. As for the item 1007 indicating the divided file cache amount, a value (32 GB) of a file cache amount 1008 (64 GB) usable by the management VS 3 is inputted to the text box 1007. This amount of file cache is divided and assigned to the new VS 220.

If the system administrator presses an "OK" button 1020, the management program 230 transmits, to the VS hierarchization management program 200, a VS creation request based on the information inputted to the screens 1001, 1002, 1003 and 1004. The VS hierarchization management program 200 executes the VS creation/deletion processor 203 to create a new VS 220 by dividing the resources on the basis of the received input items. On the other hand, if the administrator presses a "Cancel" button 1021, the management program 230 stops the creation of the new VS 220, and closes the VS creation window 1000.

Incidentally, as has been described with reference to FIG. 4, the CPU and file cache are resources that may be shared with the management VS. Hence, a new VS 220 can be created without dividing these resources from the management VS 220.

FIG. 11 illustrates a VS creation screen 1100 that the management program 230 displays on the management screen 125 when the VS1 administrator of the file server 100 creates a VS 220 in the same situation as in FIG. 10. The name of the login administrator (VS1-Administrator in FIG. 11) is displayed in an upper part 1111 of the VS creation screen 1100. Basically the same screen configuration is used in FIGS. 10 and 11. However, since the administrators logged in to the management program 230 have different access authorities in FIGS. 10 and 11, different information is displayed on each of screens 1003 and 1103 for selecting a management VS. The VS1 administrator calls the VS creation screen in FIG. 11, and thus the management program 220 only displays VS1 and VS4 which is a child VS of VS1 and which is a management VS, as management VSs to be selected in the screen 1103.

The above description has been given of the case where account authorization is carried out on the management computer 120. However, as a modified example, the account authorization processing may otherwise be carried out on the file server 100 (by the VS hierarchization management program 200, for example) In this case, an identifier of the VS 220 to be managed and authentication information are transmitted to the file server 100 when the "OK" button is pressed. Upon receipt of these pieces of information, the file server 100 checks them against authentication information that the file server 100 manages for each VS 220, and transmits the result to the management program 230. Thereafter, requests can be transmitted with authentication information added thereto. Note that any alternative measure may be employed as long as login by use of authentication information and authentication of the source of a management request can be carried out.

Moreover, other screens may be employed in the management program 230 as long as the requests can be transmitted.

The file request processing program 222A carries out the following processing in association with the above processing.

(A) When a VS 220 is created. The file request processing program 222A starts up and initializes with reference to the resource management information 202, so as to process the file sharing service by use of each of the resources. Then, the file request processing program 222A accepts access related to the file sharing service.

(B) When a VS 220 is deleted. The file request processing program 222A terminates.

(C) When an increase or decrease is detected in a resource related to a VS 220. With reference to the resource management information 202, the file request processing program 222A modifies the resource used by each VS 220 for provision of the file sharing service. Thus, provision of the service can be continued.

According to the above description, in the case of retrieving resources of VS 220D, VS 220E, VS 220G and VS 220H (referred to as descendant VSs 220) created directly or indirectly by VS 220B of FIG. 5, for example, the resources are collected by operating the VSs 220 separately. This operation, however, becomes complicated when there is a large number of VSs 220. To cope with this problem, resource retrieving may be carried out such that resources related to a specific VS 220 and resources related to its descendant VSs 220 are collected together when the specific VS 220 is designated for resource retrieving. Any of the following resource retrieving ratios may be employed among the VSs 220.

(Method A) Collect resources while keeping each of the assigned resource number and amount ratios between the VSs 220 within a certain variance range.

(Method B) Collect the same number and amount of resources for every VS 220.

(Method C) Collect resources so that each VS 220 has the originally defined resource amount (default value).

(Method D) Extract unused resources for each VS 220, and collect them altogether.

Thus, according to the present invention, resource management authority in the file server 100 can be lent to and collected from multiple management virtual servers on the basis of the hierarchization management information 201 and the resource management information 202. Here, multiple virtual servers 220 operate on the file server 100.

What is claimed is:

1. A method for providing a plurality of virtual file servers in an information processing system including a file server which is coupled to a client computer, a storage device including one or more volumes, and a management computer, comprising the steps of:

a reservation step to reserve a plurality of file cache regions to be used for caching by the plurality of virtual file servers;

a storage step to store a plurality of IP addresses set by the management computer, and resource management information including correspondence relationships among the plurality of IP addresses and the plurality of file cache regions and the plurality of virtual file servers;

a file request processing step to process a plurality of file requests transmitted from the client computer and designating the plurality of virtual file servers, by use of an assigned file cache region being a part of the plurality of file cache regions, an assigned IP address being a part of the plurality of IP addresses, and an assigned volume region being a sub-region of the one or more volumes, which corresponds to a certain virtual file server of the plurality of virtual file servers, in accordance with the resource management information;

a hierarchical information storage step to store, in hierarchization management information, a plurality of identifiers corresponding to the plurality of virtual file servers, each identifier indicating the file server being an assignment source of the assigned file cache region used by a corresponding one of the plurality of virtual file servers;

a virtual file server creation step to create a child virtual file server by receiving a child virtual file server creation request which designates one of the plurality of virtual file servers, and store an identifier of the designated virtual file server as an identifier corresponding to the child virtual file server in the hierarchization management information; and a first management step to receive a first login request designating a login virtual file server among the plurality of virtual file servers, and a first management request which is related to the first login request and which designates the child virtual file server, and execute a first management process according to the first management request, if an identifier, stored in the hierarchization management information and related to the child virtual file server, indicates the login virtual file server.

2. The method according to claim 1 for providing a plurality of virtual file servers, further comprising a second management step to receive a second login request designating the file server, and a second management request which is related to the second login request and which designates the child virtual file server, and execute a second management process according to the second management request.

3. The method according to claim 2 for providing a plurality of virtual file servers, wherein the first management process is to create a grandchild virtual file server by use of a part of the plurality of file cache regions corresponding to the child virtual file server.

4. The method according to claim 2 for providing a plurality of virtual file servers, wherein the first management process is to reduce one of the plurality of file cache regions corresponding to the virtual file server to be operated, to a certain capacity.

5. The method according to claim 1 for providing a plurality of virtual file servers, wherein the assigned volume region is a memory region provided by a part of the one or more volumes.

6. The method according to claim 1 for providing a plurality of virtual file servers, wherein the assigned volume region is a partition of the one or more volumes.

7. The method according to claim 1 for providing a plurality of virtual file servers, wherein a file system is created in the one or more volumes, and the assigned volume region corresponds to a file system space in a specific directory or lower directories in the file system of the one or more volumes.

8. A file server including a plurality of virtual file servers, which is coupled to a client computer, a storage device including one or more volumes, and a management computer, comprising:

a memory storing a plurality of IP addresses set by the management computer, a plurality of file cache regions to be used for caching by the plurality of virtual file servers, and resource management information including correspondence relationships among the plurality of IP addresses and the plurality of file cache regions and the plurality of virtual file servers; and a processor processing a plurality of file requests transmitted from the client computer and designating the plurality of virtual file servers, in accordance with the resource management information, by use of an assigned file cache region being a part of the plurality of file cache regions, an assigned IP address being a part of the plurality of IP addresses, and an assigned volume region being a sub-region of the one or more volumes, to which each of the plurality of virtual file servers corresponds wherein the memory have a hierarchization management information which stores a plurality of identifiers corresponding to each of the plurality of virtual file servers, each indicating the file server or one of the plurality of virtual file servers being an assignment source of the assigned file cache region used by a corresponding one of the plurality of virtual file servers, wherein at least one of the plurality of identifiers indicates one of the plurality of virtual file servers and at least another one of the plurality of identifiers indicates the file server, and wherein the processor receives a first login request designating a login virtual file server among the plurality of virtual file servers, and a first management request which is related to the first login request and which designates a virtual file server to be operated among the plurality of virtual file servers, and executes first management process according to the first management request if an identifier, stored in the hierarchization management information and corresponded to the virtual file server to be operated indicates the login virtual file server.

9. The file server according to claim 8, wherein the processor receives a second login request designating the file server, and a second management request which is related to the second login request and which designates the virtual file server to be operated, and executes second management process according to the second management request.

10. The file server according to claim 9, wherein the first management processing is processing for creating a virtual file server by use of a part of the plurality of file cache regions corresponding to the virtual file server to be operated.

11. The file server according to claim 8, wherein the processor restrain to execute the first management process if one of the plurality of identifiers stored in the hierarchization management information and relating to the virtual file server to be operated indicates the file server.

12. The file server according to claim 9, wherein the first management process is processing for reducing, to a certain volume, one of the plurality of file cache regions corresponding to the virtual file server to be operated.

13. The file server according to claim 12, wherein the reduced file cache region is used by the virtual file server to be operated.

14. The file server according to claim 13, wherein the file cache region reduction process is carried out in association with a caching algorithm of the virtual file server to be operated.

* * * * *